US009669948B2

(12) United States Patent
Vichnin et al.

(10) Patent No.: US 9,669,948 B2
(45) Date of Patent: Jun. 6, 2017

(54) SIDE-BY-SIDE DUAL-LAUNCH ARRANGEMENT WITH IMPROVED PAYLOAD COMPATIBILITY

(71) Applicant: Lockheed Martin Corporation, Bethesda, MD (US)

(72) Inventors: Herbert H. Vichnin, King of Prussia, PA (US); Neil E. Goodzeit, Princeton, NJ (US); David J. Hentosh, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 437 days.

(21) Appl. No.: 14/148,601

(22) Filed: Jan. 6, 2014

(65) Prior Publication Data
US 2015/0028159 A1 Jan. 29, 2015

Related U.S. Application Data

(60) Provisional application No. 61/858,080, filed on Jul. 24, 2013.

(51) Int. Cl.
*B64G 1/00* (2006.01)
*B64G 1/64* (2006.01)

(52) U.S. Cl.
CPC ........ *B64G 1/002* (2013.01); *B64G 2001/643* (2013.01)

(58) Field of Classification Search
CPC ........... B64G 1/002; B64G 1/402; B64G 1/44
See application file for complete search history.

(56) References Cited

U.S. PATENT DOCUMENTS

| 3,652,042 | A | | 3/1972 | Welther | |
|---|---|---|---|---|---|
| 5,040,748 | A | | 8/1991 | Torre et al. | |
| 5,152,482 | A | * | 10/1992 | Perkins | B64G 1/22 244/159.4 |
| 5,199,672 | A | * | 4/1993 | King | B64G 1/007 244/164 |
| 5,411,226 | A | | 5/1995 | Jones et al. | |
| 5,605,308 | A | * | 2/1997 | Quan | B64G 1/641 102/489 |
| 5,860,624 | A | | 1/1999 | Obry et al. | |
| 5,884,866 | A | * | 3/1999 | Steinmeyer | B64G 1/002 244/137.1 |
| 6,296,206 | B1 | | 10/2001 | Chamness et al. | |

(Continued)

OTHER PUBLICATIONS

Naderi, J.M., "Optimizing Spacelab Stowage in Support of Payload Operations," AIAA Space Programs & Technologies Conference, 1995, pp. 1-4.

(Continued)

*Primary Examiner* — Christopher P Ellis
*Assistant Examiner* — Jessica Wong
(74) *Attorney, Agent, or Firm* — McDermott Will & Emery LLP

(57) ABSTRACT

A side-by-side dual-launch spacecraft arrangement is provided. The arrangement may include a dual-launch adaptor, a first spacecraft, and a second spacecraft. The first spacecraft and the second spacecraft may be mounted on the dual-launch adaptor and may be arranged side by side on the dual-launch adaptor. An aspect ratio of each of the first and second spacecraft may be within a range of 0.55 and 0.8.

24 Claims, 16 Drawing Sheets

(56) References Cited

U.S. PATENT DOCUMENTS

| | | | |
|---|---|---|---|
| 6,357,698 B1 | 3/2002 | DiVerde et al. | |
| 6,557,802 B2 | 5/2003 | Kroeker | |
| 6,729,582 B2 | 5/2004 | Beyer | |
| 6,789,767 B2 | 9/2004 | Mueller et al. | |
| 6,845,949 B2 | 1/2005 | Blackwell-Thompson et al. | |
| 7,093,805 B2 | 8/2006 | Blackwell-Thompson et al. | |
| 7,686,255 B2 | 3/2010 | Harris | |
| 7,931,237 B2 | 4/2011 | Penzo | |
| 8,393,582 B1* | 3/2013 | Kutter | B64G 1/402 244/172.2 |
| 8,915,472 B2* | 12/2014 | Aston | B64G 1/40 244/171.1 |
| 2002/0000495 A1* | 1/2002 | Diverde | B64G 1/002 244/137.1 |
| 2002/0079406 A1* | 6/2002 | Kroeker | B64G 1/002 244/173.3 |
| 2014/0061386 A1* | 3/2014 | Peterka, III | B64G 1/002 244/171.5 |
| 2014/0239124 A1* | 8/2014 | Aston | B64G 1/10 244/171.7 |
| 2014/0239125 A1* | 8/2014 | Aston | B64G 1/002 244/172.3 |

OTHER PUBLICATIONS

Abdelal, et al., Finite Element Analysis for Satellite Structures, Chapter 2, Satellite Configuration Design, Springer-Verlag, London, 2013, pp. 11-47.

Breton, et al., "The Ariane family of launchers," Spacecraft Structures, Materials and Mechanical Engineering, 1996, vol. 386, p. 3-12.

Fasano, "MIP-based heuristic for non-standard 3D-packaging problems," 4OR 6.3 (2008) pp. 291-310.

Fasano, et al., "Model Development and Optimization for Space Engineering: Concepts, Tools, Applications, and Perspectives," Modeling and Optimization in Space Engineering, Springer, New York, 2013, Abstract only.

Fasano, et al., "Space module on-board stowage optimization by exploiting empty container volumes," Modeling and Optimization in Space Engineering, Springer, New York, 2013, Abstract only.

Ferguson, "Aerodynamic Design and Analysis of the Sea Launch Payload Fairing," Space Programs and Technologies Conference, 1996, Abstract only.

Hassan, et al., "Architecting a Communication Satellite Product Line," 22nd AIAA International Communications Satellite Systems Conference & Exhibit (ICSSC), Monterey, CA 2004, pp. 1-17.

Higgins, "Multiple Payload Adapters: Opening the Doors to Space," 16th Annual AIAA/USU Conference on Small Satellites, 2002, 8 pages.

Huang, "Spacecraft Antenna Research and Development Activities Aimed at Future Missions," Spacebourne Antennas for Planetary Exploration 1 (2006) 485-536.

Moss, et al., Spacecraft Systems Engineering, Fourth Edition, Chapter 7, "Launch Vehicles", John Wiley & Sons, 2011, pp. 221-250.

Nichols, "The Space Launch Payload Process," Defense and Space Programs Conference & Exhibit—Critical Defense and Space Programs for the Future, 1997, pp. 217-224.

Othman, et al., "Parametric Analysis of the Communication Satellite Characteristics," Space Science & Communication, 2009, IconSpace 2009, pp. 115-118.

Dowen, et al., "Development of a Reusable, Low Shock Clamp Band Separation System for Small Spacecraft Release Applications," Proc. 9th European Space Mechanisms & Tribology Symposium, 2001, pp. 191-198.

Pendleton, "Low Cost Flat Plate Adapters for Dual Primary Payload Missions," 51st AIAA/ASME/AHS/ASC Structures, Structural Dynamics, and Materials Conference, 2010, pp. 1-9.

Rivera, et al., "Automated Design Optimization and Trade Studies Using STK Scenarios," 43rd AIAA Aerospace Sciences Meeting and Exhibit, 2005, p. 1.

Shirlaw, et al., "Payload Technology for Rural Satellite Communications," Communication Technology Proceedings, 1996. ICCT '96, vol. 2, May 5-7, 1996, pp. 1130-1133.

Thomas, et al., "Launch Vehicle Payload Adapter Design with Vibration Isolator Features," Smart Structures and Materials, 2005, Proceedings of SPIE vol. 5760, pp. 35-45.

Xiao, et al., "Two Hybrid Compaction Algorithms for the Layout Optimization Problem," BioSystems, Sep.-Oct. 2007, vol. 90, Issue 2, pp. 560-567.

* cited by examiner

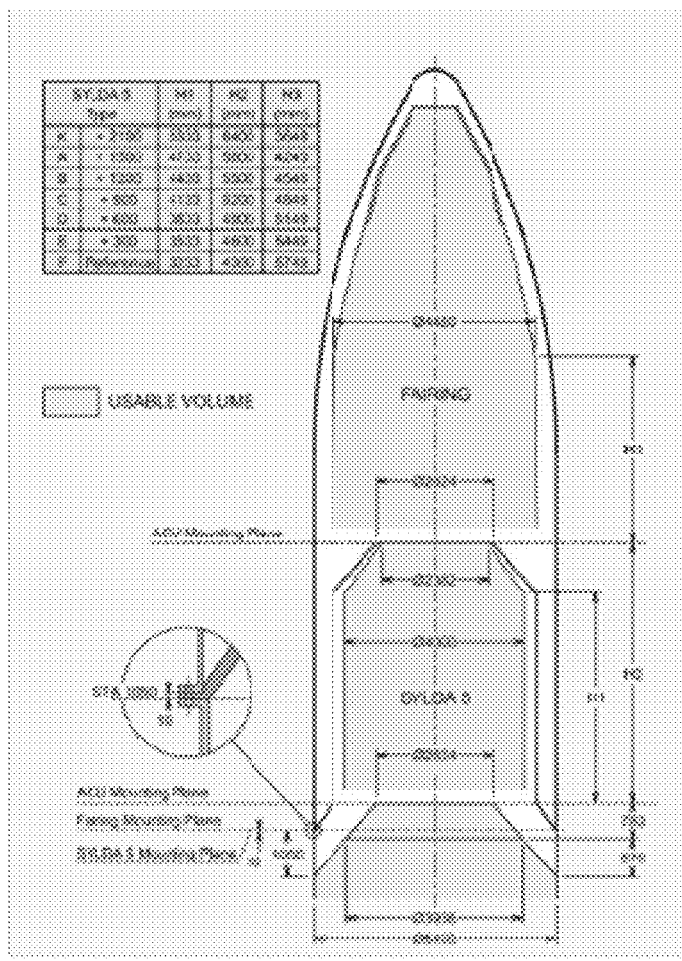 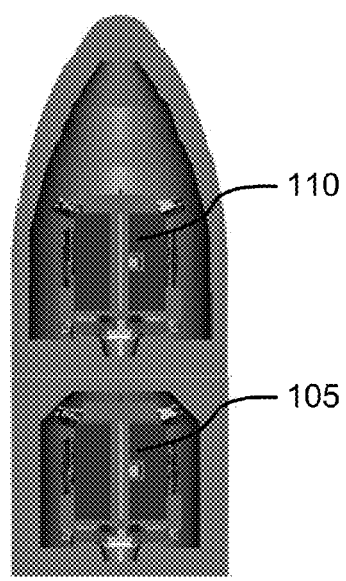
FIG. 1A
(PRIOR ART)
FIG. 1B
(PRIOR ART)

FIG. 11A  FIG. 11B

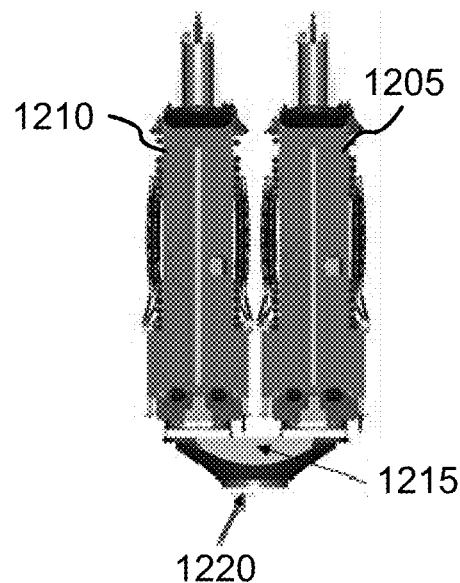
FIG. 12A
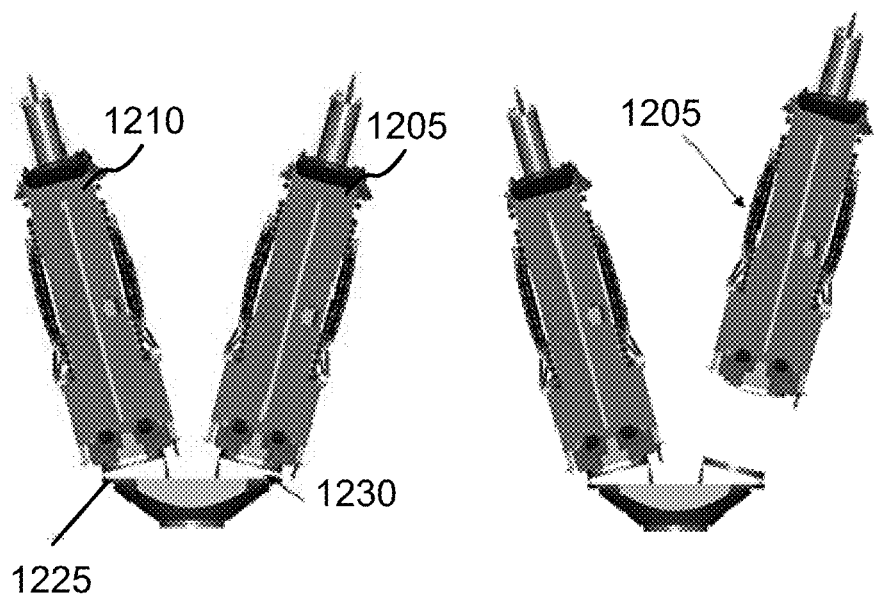
FIG. 12B  FIG. 12C

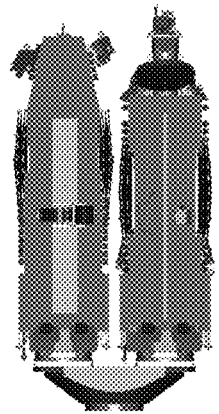 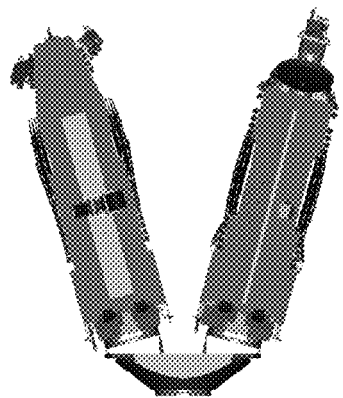 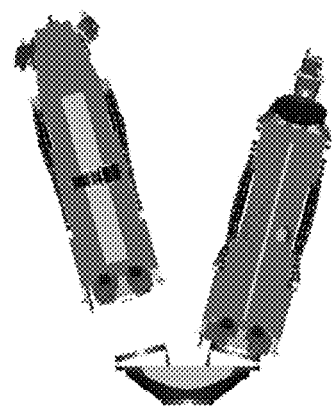
FIG. 14A  FIG. 14B  FIG. 14C
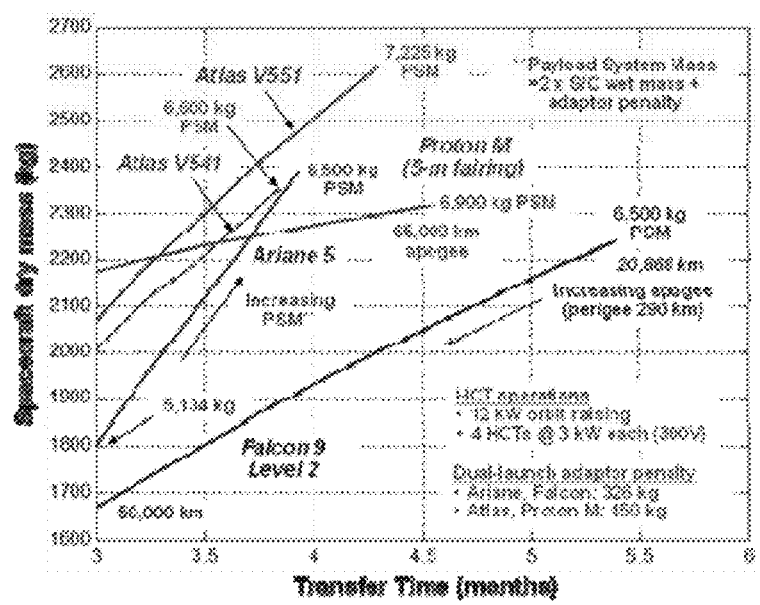
FIG. 15

SIDE-BY-SIDE DUAL-LAUNCH ARRANGEMENT WITH IMPROVED PAYLOAD COMPATIBILITY

CROSS-REFERENCE TO RELATED APPLICATIONS

The patent application claims the benefit of priority under 35 U.S.C. §119 from U.S. Provisional Patent Application No. 61/858,080, filed Jul. 24, 2013, which is incorporated herein by reference in its entirety.

STATEMENT REGARDING FEDERALLY SPONSORED RESEARCH OR DEVELOPMENT

Not applicable.

FIELD

The present disclosure generally relates to a dual-launch arrangement and in particular to, for example, a side-by-side dual-launch arrangement with improved payload compatibility.

BACKGROUND

Geo-synchronous Earth-Orbit (GEO) spacecraft operators generally desire to maximize spacecraft payload performance and minimize launch cost. One way to reduce launch cost is to launch multiple spacecraft on a single booster. Existing dual-launch methods for GEO spacecraft involve vertically stacked spacecraft configurations that impose constraints on the size of each individual spacecraft and the types of payloads that can be accommodated. The limitations include the aperture size and focal lengths of antennas on each spacecraft, the number of antennas on each spacecraft, and the ability to accommodate other types of payloads such as earth-observing instruments.

FIG. 1A shows an Ariane 5 dual-launch configuration using a SYLDA 5 payload dispenser that partitions the fairing volume into two segments, a lower position and an upper position. FIG. 1B shows two spacecraft arranged in the Ariane 5 dual-launch configuration. The SYLDA 5 encapsulates a lower spacecraft 105 and provides structural support for an upper spacecraft 110. The SYLDA 5 is generally heavy and expensive. The increased mass limits lift capability available to payload. Despite the fact that two spacecraft can be launched together, Ariane 5 launches are still relatively expensive, and an efficient method is needed for launching two GEO communications spacecraft in either the lower or upper position, thereby permitting Ariane 5 to carry three or four spacecraft on a single launch.

In general, Ariane 5 is less efficient and more costly because the Ariane 5 uses a SYLDA to facilitate dual launch in a stacked configuration. This inefficiency has given rise to the stacked configuration where an upper spacecraft is directly attached to a lower spacecraft, as shown for example by the Falcon 9 and Proton stacked dual launch. By attaching the upper spacecraft directly to the lower spacecraft, the need for a SYLDA can be avoided, where, once again, the SYLDA is heavy and expensive and the increased mass from the SYLDA reduces the launch vehicle payload lift capability to the GEO transfer orbit.

Table 1 shows different SYLDA 5 types and corresponding values for heights H1, H2, and H3, as labeled in FIG. 1A, for the different SYLDA 5 types.

TABLE 1

Different SYLDA 5 types and corresponding height dimensions.

| SYLDA 5 Type | | H1 (mm) | H2 (mm) | H3 (mm) |
|---|---|---|---|---|
| K | +2100 | 5333 | 6400 | 3649 |
| A | +1500 | 4733 | 5800 | 4249 |
| B | +1200 | 4433 | 5500 | 4549 |
| C | +900 | 4133 | 5200 | 4849 |
| D | +600 | 3833 | 4900 | 5149 |
| E | +300 | 3533 | 4600 | 5449 |
| F | Reference | 3233 | 4300 | 5749 |

A stacked dual-launch configuration for medium-class GEO spacecraft on Falcon 9 has been provided, where an upper spacecraft mounts to an adaptor on the earth deck of a lower spacecraft. FIG. 2A shows a cross-section of a Falcon 9 stacked dual-launch system, which carries two stacked spacecraft 205 and 210. Characteristics of a representative stacked dual-launch spacecraft design of FIG. 2A are shown in Table 2 and Table 3.

TABLE 2

Payload accommodations for stacked dual-launch configuration.

| | |
|---|---|
| Mass | Up to 500 kg |
| Repeater Bands | C-band, Ku-band, Ka-band |
| Power | 3 kW to 7.5 kW end of life (EOL) payload power |
| Flexible Payloads | 2-4 deployed antennas & option for nadir mount; adaptable to support GFE & CFE payloads |
| Interfaces | SpaceWire, RS422, 1553 |

TABLE 3

Bus specifications for stacked dual-launch configuration.

| | |
|---|---|
| Size | 1.8 m × 1.9 m × 3.5 m tall |
| Mass | Up to 1900 kg (wet, including payload) |
| Power | 3 kW-7.5 kW for payload (total, EOL) |
| Battery | Li-Ion |
| Delta-V | GTO-GEO transfer (up to 400 kg propellant) |
| Life | 15 year service life |
| Control | Zero-momentum, 3-axis |

FIG. 2B shows a cross section of a Proton-M dual-launch configuration, which carries two stacked spacecraft 255 and 260. The stacked arrangement is similar to that shown with reference to FIG. 2A.

In each of FIGS. 1A, 1B, 2A, and 2B, because the spacecraft are vertically stacked, the height of each spacecraft is highly constrained. The height constraint limits antenna aperture sizes and focal lengths that can be utilized with each spacecraft. This is a significant drawback if large aperture and high focal length antennas are needed to meet payload performance requirements.

Furthermore, the lower position spacecraft cannot have earth-deck mounted antennas or other types of payloads such as earth-observing instruments, which in general reduces the commercial value of the spacecraft. In practice, these limitations may make it difficult to configure a spacecraft for a given mission or find co-passengers necessary to carry out a stacked dual launch.

For the Falcon 9 and Proton-M 5-m fairings, shown respectively in FIGS. 2A and 2B, the maximum stacked-launch spacecraft height compatible with both launch vehicles may be limited to about 3.5 m, which is also listed in Table 3 with reference to Falcon 9. Because the spacecraft serves as a metering structure for east and west (side-mounted) offset-fed antennas, the focal length of these antennas is generally limited by the height of the spacecraft. It may be possible to achieve longer focal lengths using folded-optics antennas (e.g., Gregorian designs). However, the folded-optics antennas have higher cost due to the need for sub-reflectors and additional deployment mechanisms.

As an example, assuming a focal-length-to-diameter ratio (F/D), also referred to as an f-number, of 1.4, the largest aperture size of the antenna that can be accommodated on a 3.5 m spacecraft is about 2.5 m. Spot-beam missions, however, may require larger aperture sizes, such as aperture sizes between 3 m and 5 m, for example, which could dictate a focal length of up to 7 m. For the upper position of an Ariane 5 with the SYLDA+1500 mm (see Table 1), the spacecraft height for a stacked dual launch would be further limited to about 2.6 m. In this case, the largest aperture size that could be accommodated would be about 1.8 m. For the lower position of the Ariane 5, the short fairing likely makes a stacked configuration for a GEO communications spacecraft impractical.

FIG. 3A shows a vertical cross-section of two Galileo spacecraft 305 and 310 in a side-by-side dual-launch configuration. FIG. 3B shows a horizontal cross-section of the two Galileo spacecraft 305 and 310 in a side-by-side dual-launch configuration. The two Galileo spacecraft 305 and 310 can be in a 4-m Soyuz fairing for example. The Galileo spacecraft, which is a Medium Earth-Orbit (MEO) navigation spacecraft, can be generally categorized as small spacecraft. Example dimensions for the Galileo spacecraft are about 1.1 m (y-axis) and 1.2 m (z-axis) for the lateral dimensions and 2.7 m for the height. Accordingly, the aspect ratio is 0.92. The dual-launch arrangement includes a custom dual-launch adaptor 315 that is sandwiched between the two spacecraft. Because the custom dual-launch adaptor 315 mounts between the two spacecraft 305 and 310, the spacecraft 305 and 310 cannot accommodate payload components such as antennas on both sides.

SUMMARY

In some aspects of the subject technology, a Geo-synchronous Earth-Orbit (GEO) side-by-side dual-launch spacecraft arrangement is provided. The arrangement may include a first spacecraft and a second spacecraft, where the first spacecraft has a first aspect ratio and the second spacecraft has a second aspect ratio, where the aspect ratio may be a ratio of a size of a corresponding spacecraft along a first lateral dimension and a size of the corresponding spacecraft along a second lateral dimension, the first and second lateral dimensions being perpendicular to each other and perpendicular to a height of the corresponding spacecraft. Each of the first aspect ratio and the second aspect ratio may be within a range of 0.55 and 0.8. The arrangement may also include a dual-launch adaptor, a first core cylinder structure, and a second core cylinder structure. The first spacecraft may be mounted on the dual-launch adaptor by the first core cylinder structure and the second spacecraft may be mounted on the dual-launch adaptor by the second core cylinder structure, with the first spacecraft and the second spacecraft arranged side by side. The first spacecraft may include a first payload component mounted on a first side of the first spacecraft and a second payload component mounted on a second side of the first spacecraft, where the second side is opposite the first side. The second spacecraft may include a third payload component mounted on a first side of the second spacecraft and a fourth payload component mounted on a second side of the second spacecraft, where the second side may be opposite the first side.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 1A shows an Ariane 5 dual-launch configuration using a SYLDA 5 payload dispenser.

FIG. 1B shows two spacecraft arranged in the Ariane 5 dual-launch configuration.

FIG. 11A depicts a view of an example GEO spacecraft in a stowed configuration, according to certain aspects of the present disclosure.

FIGS. 11B and 11C depict a top view and a perspective view, respectively, of the GEO spacecraft of FIG. 11A in a deployed configuration, according to certain aspects of the present disclosure.

FIGS. 12A through 12C depict an exemplary deployment sequence for a GEO satellite in a side-by-side launch configuration, according to certain aspects of the present disclosure.

FIGS. 14A through 14C depict an exemplary deployment sequence for a GEO satellite in a side-by-side launch configuration, where GEO spacecraft are non-identical, according to certain aspects of the present disclosure.

FIG. 15 shows a graph that provides dual-launch mission performance, according to certain aspects of the present disclosure.

DETAILED DESCRIPTION

Figure 2A:
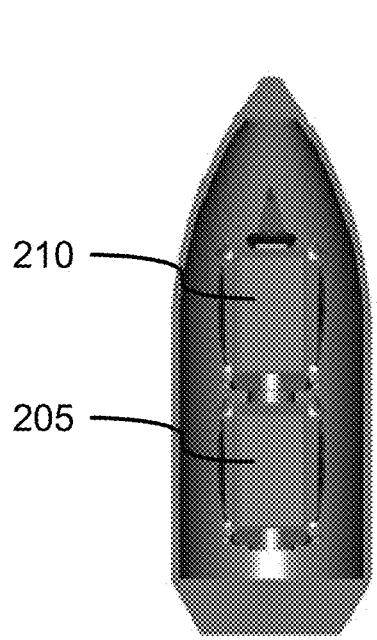
FIG. 2A shows a cross-section of a Falcon 9 dual-launch configuration.

The present disclosure generally relates to a side-by-side dual-launch configuration and a low-aspect-ratio spacecraft design that can accommodate a wide range of antenna sizes and geometries and/or other kinds of payload components such as earth-observing instruments. In one or more implementations, an aspect ratio of a spacecraft refers to a ratio of a first lateral dimension to a second lateral dimension of the spacecraft. In one or more implementations, an aspect ratio of a spacecraft refers to a ratio of a first lateral dimension to a second lateral dimension of the bus of the spacecraft.

In one or more implementations, payload components, which may be referred to as payload equipment or payloads, can include antennas (e.g., reflectors and feeds), earth-observing instruments, space-weather instruments, remote-sensing instruments (e.g., sounders, imagers), and so forth. Payload components can be of various sizes and geometries (e.g., small horn antennas, antennas with large reflectors, phased-array antennas, direct-radiating array antennas, integrated feed and reflector assemblies, etc.). In one or more implementations, an antenna may be an entire antenna system including, by way of example and not of limitation, at least one reflector and at least one feed. In one or more aspects, an antenna may refer to a component (e.g., a reflector) of an antenna system. The payload components may be mounted on one or more of North/South panels, East/West panels, as well as other panels (e.g., interior shelves, earth deck, etc.).

The disclosed system provides a volume-efficient dual-launch configuration where two spacecraft are arranged side-by-side within the launch vehicle fairing. The two spacecraft are mounted on an adaptor system that can attach to a standard launch vehicle interface. The side-by-side compatible spacecraft design has a smaller cross-section aspect ratio than standard GEO spacecraft designs but has a height that may be similar to standard GEO designs. Therefore, the spacecraft can be designed to accommodate large aperture and long focal length antennas as needed to meet payload performance requirements. Such a spacecraft can also be configured to accommodate multiple antennas or other deployable payloads on each side of the spacecraft. The disclosed spacecraft can utilize a standard-size core cylinder structure (approximately 1194 mm in diameter) and a standard propulsion configuration that may include a Xenon propulsion system for orbit transfer and stationkeeping. Although the discussion will be made with reference to GEO applications, Highly Elliptical Orbit (HEO) applications or Medium Earth Orbit (MEO) applications can also be realized, in accordance with one or more implementations of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding. The term "example" is sometimes used a noun and sometimes used as an adjective.

Figure 4A:
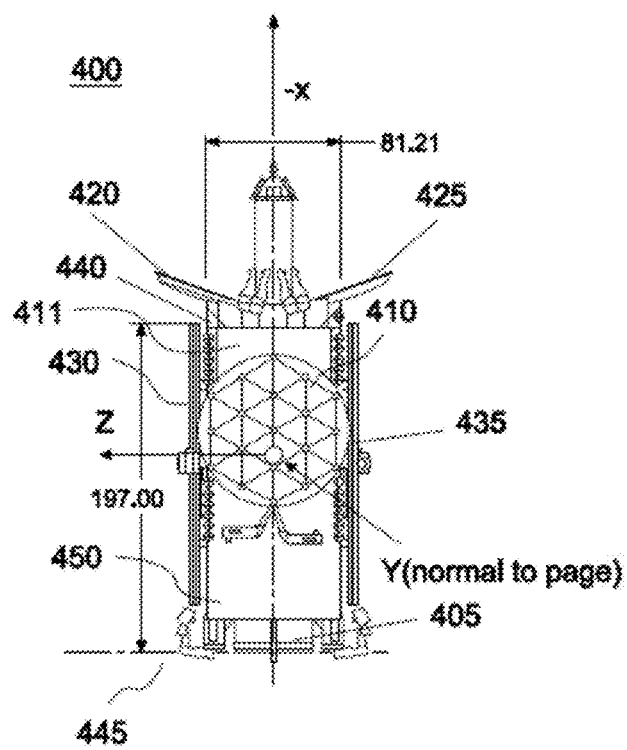
FIGS. 4A through 4C illustrate side, front, and top views, respectively, of a GEO spacecraft in a stowed configuration, according to certain aspects of the present disclosure.
Figure 4B:
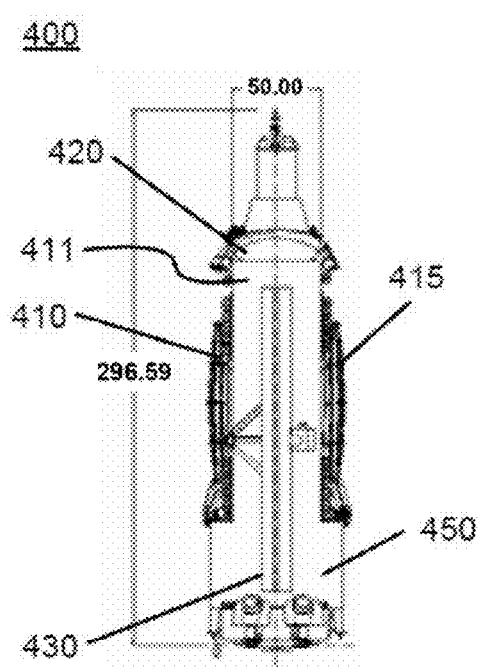
Figure 4C:
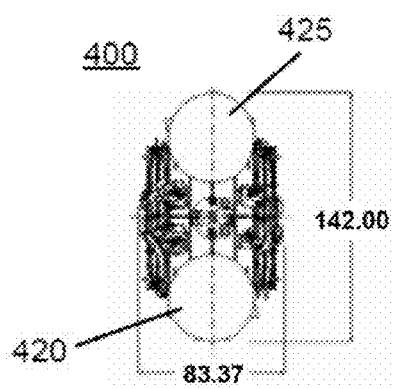

FIGS. 4A through 4C show side, front, and top views, respectively, of a GEO spacecraft 400 in a stowed configuration, according to certain aspects of the present disclosure. The GEO spacecraft 400 can be utilized as one of two spacecraft positioned in a side-by-side configuration. In one or more implementations, for purposes of discussion, and as labeled in FIG. 4A, the x-axis is the longitudinal axis (in-orbit yaw), and the y- and z-axes are the lateral axes (in-orbit roll and pitch).

The GEO spacecraft 400 includes a core cylinder structure 405. For example, the core cylinder structure 405 can be a standard-size core cylinder structure (e.g., 1194 mm core cylinder structure). The GEO spacecraft 400 also includes a first side-mounted antenna 410 mounted on a first side (e.g., east side) of the GEO spacecraft 400 and a second side-mounted antenna 415 mounted on a second side (e.g., west side) of the GEO satellite 400, where the second side is opposite the first side. The first antenna 410 and the second antenna 415 can have the same diameter. In some implementations, the first side and the second side of the GEO spacecraft 400 are substantially symmetrical with each other. Accordingly, in these implementations, the first antenna 410 and second antenna 415 may be similar, differing only in surface shape or offset or focal length, or number of feeds, or other commonly-modified antenna parameters that depend on the operating frequencies and coverage region.

In one or more implementations, the GEO spacecraft 400 also includes two earth-deck mounted antennas 420 and 425 mounted on an earth deck of the GEO spacecraft 400. A spacecraft configuration according to the present disclosure may also have fewer or a greater number of earth-deck mounted antennas, which may include antennas with offset-fed and folded-optics geometries and with either fixed or deployable reflectors. In one or more implementations, the GEO spacecraft 400 also includes solar arrays 430 and 435, where one of the solar arrays is on a third side and the other solar array is on a fourth side of the GEO spacecraft 400, where the fourth side is opposite the third side. The solar arrays 430 and 435 derive electricity from sunlight and can be, for example, photovoltaic solar arrays. Solar array dimensions are constrained by the bus dimensions and the fairing. For a spacecraft according to one or more implementations, the y-axis solar array dimension is about the same as the bus y-axis dimension (e.g., 1.3 m). The solar array must fit between the spacecraft North or South panel and the fairing.

In one or more implementations, two sides that are opposite of each other have the same size. For example, a first side (e.g., west side) and a second side (e.g., east side) that is opposite the first side can have the same dimensions. Similarly, a third side and a fourth side can have the same dimensions. In some implementations, for the two sides that are opposite of each other, the two sides can have the same lateral dimension (e.g., width), the same height, or both the same lateral dimension and the same height.

In one or more implementations, a lateral dimension may be the size (e.g., width) of the entire stowed spacecraft along a y-axis. In one or more implementations, a lateral dimension may be the size of a side from one end to the other end of the bus structure along a y-axis. In one or more implementations, a lateral dimension may be the minimum size of a side from one end to the other end of the bus structure along a y-axis. In one or more implementations, a lateral dimension may be the minimum distance between the east and west panels of a bus structure along a y-axis. In one or more implementations, a lateral dimension may be the size of the entire stowed spacecraft along a z-axis. In one or more implementations, a lateral dimension may be the size of a side from one end to the other end of the bus structure along a z-axis. In one or more implementations, a lateral dimension may be the minimum size of a side from one end to the other end of the bus structure along a z-axis. In one or more implementations, a lateral dimension may be the minimum distance between the north and south panels of a bus structure along a z-axis.

In one or more implementations, two sides that are opposite of each other are parallel to each other. In one example, an east side and a west side of a bus may be parallel to each other. In one example, at least a majority (e.g., greater than 50%, 60%, 70%, 80%, or 90%) of the surfaces of the bus on the east side and a majority (e.g., greater than 50%, 60%, 70%, 80%, or 90%) of the surfaces of the bus on the west side may be parallel to each other. Similarly, a north side and a south side of the bus may be parallel to each other. In one example, at least a majority (e.g., greater than 50%, 60%, 70%, 80%, or 90%) of the surfaces of the bus on the north side and a majority (e.g., greater than 50%, 60%, 70%, 80%, or 90%) of the surfaces of the bus on the south side may be parallel to each other.

In one or more implementations, when a first antenna is mounted on a first side (e.g., east side) and a second antenna is mounted on a second side (e.g., west side), the first and second antennas in their stowed positions may be substantially parallel to each other. In one or more implementations, when a first solar array is mounted on a first side and a second solar array is mounted on a second side, the first and second solar arrays may be substantially parallel to each other (in their stowed positions and/or unstowed positions).

In one or more implementations, a bus may consist of four sides, each side may be perpendicular to its adjacent sides, and each side may be substantially rectangular in shape. In one or more implementations, a height of a bus may be greater than any one of the sides of the bus (e.g., the height may be greater than the lateral dimension of any one of the four sides). In one of more implementations, the east and west sides of a bus may be comprised of several parallel but non-planar panels, where the distance between the east and west panels along a y-axis varies in the spacecraft x-axis direction.

The spacecraft according to one or more implementations of the present disclosure include a bus and a payload. A bus (e.g., 411 in FIG. 4A) may include a structure with a center cylinder that is enclosed by a set of flat panels, such as those shown for instance in FIG. 8B. The bus and payload equipment are mounted to the North/South panels (parallel to the x/y plane). The side-mounted antennas, where antennas are part of the payload, are mounted to the East/West panels (parallel to the x/z plane). Equipment may be mounted on other panels as well (e.g., interior shelves, earth deck, etc.). The phrase North/South may be referred to as N/S, and the phrase East/West may be referred to as E/W. Also, the width of the bus along a y-axis may vary in the x-axis direction, as shown in FIGS. 4A and 4B, where the lower portion 450 of the bus structure 411 near the base panel is wider than the region where the antenna reflector is mounted.

In one or more implementations, an aspect ratio of a spacecraft is a ratio of a lateral y-axis dimension of a bus of the spacecraft to a lateral z-axis dimension of the bus. The aspect ratio of the GEO spacecraft according to one or more implementations can be the ratio of the minimum bus structure y-axis dimension (E/W dimension) to the minimum bus structure z-axis dimension (N/S dimension). The y-axis dimension, which is the smaller of the two dimensions, is chosen to provide sufficient clearance within the launch vehicle fairing for side-mounted antennas, where each antenna includes at least one feed assembly and a reflector. The launch vehicle fairing may be a Falcon fairing, a Proton-M 5-m fairing, an Atlas V 5-m fairing, an Atlas V Dual-Satellite System (DSS), an Delta IV 5-m fairing, an Ariane 5 upper position (above a SYLDA 5), an Ariane 5 lower position (within a SYLDA 5), or any other similar launch vehicle fairings or satellite encapsulation systems. The selection takes into account, by way of example and not of limitation, that two spacecraft are to be positioned side-by-side, that one or both spacecraft may include side-mounted antennas, and that the antennas may include a single reflector or two or more stacked reflectors on either side of each spacecraft, or may include one or more antennas that are stowed adjacent to one another. In an example, the aspect ratio of a spacecraft selected can depend on, among others, the size and geometry of a fairing and the size, number, and arrangement of the payload (e.g., antennas) on the spacecraft. An antenna can have an unfurlable reflector that folds up into a compact bundle when stowed or a rigid reflector.

Once the y-axis dimension is established, the z-axis dimension can be selected to provide space adjacent to the core cylinder for mounting equipment internal to the spacecraft on the N/S panels. Generally, a minimum clearance of at least 0.41 m (16 inches) is desirable between the core cylinder and the N/S panel. The z-axis dimension is also selected to provide adequate E/W panel area for mounting rigid reflectors of up to about 2.5 m (98.4 in) diameter. Furthermore, the z-axis dimension can be selected to provide adequate clearance within the fairing for solar arrays mounted adjacent to the N/S panels. The space that must be provided depends on the solar array design. By making the z-dimension larger, added internal mounting area and a larger East/West radiator may be provided. However, as the z-dimension grows the total E/W panel area grows and the spacecraft mass increases. A range of aspect ratios according to preferred implementations for the side-by-side dual launch GEO spacecraft may be determined through an optimization process that considers the range of factors described above.

In one or more implementations, an aspect ratio of a spacecraft is a ratio of a lateral y-axis dimension of the entire spacecraft to a lateral z-axis dimension of the entire spacecraft. In one or more implementations, an aspect ratio of a spacecraft is a ratio of a minimum lateral y-axis dimension of the entire spacecraft to a minimum lateral z-axis dimension of the entire spacecraft. Example dimensions according to one preferred implementation are provided with reference to FIGS. 4A through 4C. An example total height of the GEO spacecraft 400 (bus plus payload) is about 7.53 m (296.59 in). An example lateral size of the GEO spacecraft 400 (bus plus payload) along the z-direction and the y-direction are about 3.61 m (142 in) and 2.12 m (83.37 in), respectively. From these lateral sizes, a ratio of the entire GEO spacecraft 400 of 2.12 m/3.61 m=0.59 is achieved. An example bus height of the GEO spacecraft 400, which is the distance between a top of the earth deck (e.g., 440) and a separation plane (e.g., 445) of the GEO spacecraft 400, is about 5.00 m (197 in). An example diameter of each of the earth-deck antennas 420 and 425 is about 1.27 m (50 in). An example distance between the north and south panels is about 2.06 m (81.21 in) along the z-direction.

It is noted that additional example dimensions are provided throughout the present disclosure. Additionally, other dimensions for a GEO spacecraft and its components (e.g., side-mounted antennas, earth-deck mounted antennas, other types of side-mounted or earth-deck mounted payload components) can also be utilized so long as the GEO spacecraft and/or its components as a whole fit within a fairing under consideration and the GEO spacecraft meets payload performance requirements.

In one preferred implementation, an aspect ratio of each of the two spacecraft positioned in the side-by-side configuration is in a range between 0.55 and 0.8. The bus height of the two spacecraft can be up to about 5 m (197.00 in), which is larger than the 3.5 m (137.8 in) generally associated with a stacked dual-launch configuration. The total spacecraft height (bus plus payload) depends on the height of any deck-mounted antennas (part of the payload), or any deck-mounted remote-sensing instruments (part of the payload), and is limited by the height available in a particular launch vehicle fairing. The example dimensions described with reference to FIGS. 4A through 4C, for instance, yield an aspect ratio of 0.59, as indicated above.

One difficulty of spacecraft design is in packaging or mounting antennas on sides of the spacecraft, given dimensional constraints due to the size of the fairing, size of the antennas, and size of other components that also need to be within or mounted on the spacecraft. The antennas are generally folded up and mounted on the sides of the spacecraft when in a stowed configuration (i.e., prior to deployment). The size of the antennas (e.g., size of the reflectors of the antennas), when in a stowed configuration, dictates dimensions of the spacecraft, and the spacecraft with its side-mounted antennas, among other components, must fit within the dimensional confinement of the fairing.

In one or more implementations of the present disclosure, the side-by-side configuration can be utilized in applications involving spacecraft with large antennas, such as GEO applications. For instance, in GEO applications, reflector antennas are generally used, where the reflector antennas include reflectors and feeds. Feeds of the antennas can be attached on a deck (e.g., the earth deck), and may include a single feed element or multiple feed elements arranged in a geometric pattern and configured as a single "feed assembly". In many cases, GEO applications require spacecraft with antenna reflectors on both sides of the spacecraft. Reflectors of the antennas can have a diameter in ranges as large as 2.03 m to 2.54 m (80 in to 100 in). Reflectors of these example sizes (or larger in some cases) may be needed to achieve payload performance requirements. With shorter spacecraft, such as those associated with stacked dual-launch configurations, it is difficult to accommodate large antennas and, accordingly, it is difficult to get a long focal length. Furthermore, if a lateral dimension of the spacecraft is widened such that the aspect ratio of the spacecraft is closer to 1, the antennas needed to achieve payload performance requirements for GEO applications would not be possible (e.g., would not fit) for spacecraft in a side-by-side dual-launch configuration.

In accordance with one or more implementations, the aspect ratio of the two spacecraft, which are to be positioned side-by-side within a fairing, is designed such that antennas can be packaged or mounted along a first side (e.g., east side) and a second side (e.g., west side) of each spacecraft, where the second side is opposite the first side. Specifically, in one or more implementations of the present disclosure, unlike standard GEO spacecraft designs that have cross-section aspect ratios between 0.9 and 1.0, the spacecraft of the present disclosure can have an aspect ratio between about 0.55 and 0.80. Example lateral dimensions of standard GEO spacecraft bus structure are between 1.83 m (72 in) and 2.29 m (90 in). The term side may be referred to as face. For example, an east side may be referred to as an east face, and a west side may be referred to as a west face.

With reference to standard GEO spacecraft designs, the aspect ratios are generally close to 1.0, as there are disadvantages to a narrower design. Aspect ratios closer to 1.0 are generally utilized to aid in satisfying the performance requirements such as payload performance, thermal dissipation capability and equipment mounting area, and mass efficiency. For example, when considering single launch within a 4-m fairing, a ratio of the y-axis to the z-axis dimension of less than 1.0 might not efficiently use the available fairing volume. With standard antenna reflectors mounted to the E/W sides, there would be unused volume between the reflector and the fairing. By growing the y-axis dimension of the spacecraft bus to achieve an aspect ratio close to 1.0, this volume may be accessed for added equipment mounting and thermal radiator area. Second, as the spacecraft bus is made narrower, the bus height must increase to provide sufficient panel area. The increased bus height increases the distance from the separation plane to the spacecraft center-of-mass. The higher center-of-mass results in larger launch loads and, therefore, a stronger and heavier structure must be provided. The increased structure mass reduces the mass available for payload. Also, as the spacecraft height increases the payload radio frequency output losses increase because the waveguide or cable runs connecting the radio frequency amplifiers to the antenna feed networks increase in length. Also, a taller spacecraft limits the height of the deck-mounted antenna system or remote-sensing instrument that can fit within the fairing. Accordingly, a ratio of the y-axis dimension to the z-axis dimension of less than 0.9 is generally considered not desirable in standard GEO spacecraft designs. Furthermore, it is more difficult to package a standard rigid-panel solar array on a narrower spacecraft, which has a ratio less than 0.9. For a narrower spacecraft, to achieve a required total solar array area, the number of solar array panels and hinge lines must increase, increasing the solar array cost and mass.

In still other standard designs, such as single launch within a 5-m fairing, an aspect ratio of the y-axis dimension to the z-axis dimension of greater than 1.0 may be desirable. In this case, a spacecraft designer may choose to retain the standard z-axis dimension and expand the spacecraft in the y direction to enable larger N/S panels, which, once again, provides increased area for equipment mounting and added thermal capacity.

Although one or more implementations of the side-by-side dual-launch arrangements of the present disclosure may be associated with some drawbacks in performance requirements relative to standard designs, the drawbacks are generally outweighed by the benefit of nearly halving the launch cost. Furthermore, the standard designs are incapable of stowing antennas of larger sizes in conjunction with side-by-side arrangement of spacecraft, as previously indicated. Additionally, the side-by-side dual-launch arrangements have advantages over approaches using stacked spacecraft as previously indicated.

Figure 2B:
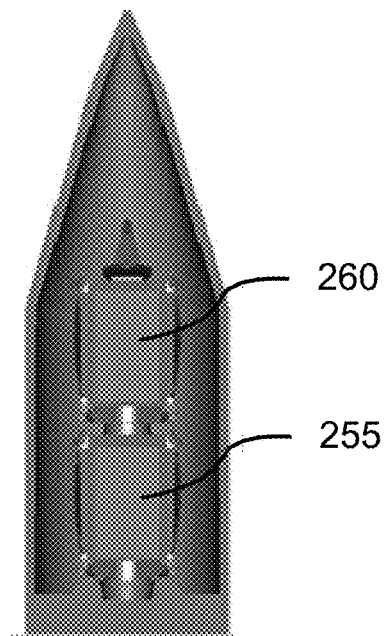
FIG. 2B shows a cross-section of a Proton-M dual-launch configuration.

Satellites in an existing stacked configuration, such as shown in FIGS. 2A and 2B, can have, for example, lateral dimensions of 1.8 m and 1.9 m and, accordingly, an aspect ratio of 0.95=1.8 m/1.9 m. In contrast, each satellite in a side-by-side configuration can have, for example, an aspect ratio of about 0.62=1.3 m/2.1 m. In the example for the side-by-side configuration, the spacecraft's z-axis dimension of roughly 2.1 m is typical of that for a standard GEO spacecraft. However, the spacecraft's y-axis dimension is smaller than a standard GEO spacecraft design to allow the spacecraft to fit within the fairing and accommodate large-aperture side-mounted antennas. Assuming use of a standard-size central core cylinder structure, the y-axis dimension is no less than about 1.3 m to accommodate a standard-sized 1.2 m diameter center core cylinder structure (e.g., nominal 1194 mm standard core cylinder structure) that provides structural support and includes propellant tanks, such as hydrazine, oxidizer, or Xenon tanks.

In one or more implementations of the present disclosure, spacecraft to be utilized in a side-by-side launch configuration are designed to have an aspect ratio between about 0.55 and 0.80. A lower bound of 0.55 for the aspect ratio is associated with a lower bound for the size (e.g., lateral dimensions) of the spacecraft such that the spacecraft is still sufficiently large to utilize a standard-size core cylinder structure (e.g., nominal 1194 mm core cylinder structure). Having an aspect ratio smaller than 0.55 will generally make it difficult or unfeasible for the spacecraft to utilize a standard-size core cylinder structure, since the smaller aspect ratio is associated with a narrowing along a lateral dimension (e.g., along the y-axis). As indicated previously, both lateral dimensions are no less than about 1.3 m to accommodate the standard-size 1.2 m diameter center core cylinder structure.

On the other hand, an upper bound of 0.8 for the aspect ratio is associated with an upper bound for the size of the spacecraft such that the spacecraft is appropriately sized to accommodate antennas mounted on the sides of the spacecraft. Having an aspect ratio greater than 0.8 will generally make it difficult or unfeasible for the spacecraft to accommodate antennas of larger sizes (such as utilized in GEO applications) on the sides of the spacecraft, since the larger aspect ratio is associated with a widening along a lateral dimension (e.g., along the y-axis).

In one or more preferred implementations, an aspect ratio may be between 0.55 and 0.65. In one or more preferred implementations, an aspect ratio may be between 0.55 and 0.7. In one or more preferred implementations, an aspect ratio may be between 0.55 and 0.75. As previously indicated, the selection of the aspect ratio for each spacecraft may take into account, by way of example and not of limitation, that two spacecraft are to be positioned side-by-side, that one or both spacecraft may include side-mounted payload (e.g., antennas), and that the antennas may include a single reflector or two or more stacked reflectors on either side of each spacecraft.

Some satellite applications may utilize multiple small spacecraft within a fairing. A small spacecraft is, for example, a spacecraft that is smaller than 1.3 m along one or both lateral bus dimensions and/or shorter than 3 m in bus height. These spacecraft are not suitable for GEO applications as they are too small. For example, small spacecraft cannot accommodate large antennas required for GEO applications (e.g., antennas having a diameter greater than 3 m). Furthermore, small spacecraft are not suitable for use with a standard core cylinder structure, such as the standard-size 1194 mm core cylinder structure, which is used by large spacecraft in GEO applications to provide structural support and to contain necessary propellant tanks Alternative or in conjunctive with physical dimensions, a spacecraft can be small based on its launch mass. For example, a small spacecraft may have a launch mass of around 800 kg, which is about a factor of two or three lower than GEO spacecraft in accordance with one or more implementations of the present disclosure.

Figure 3A:
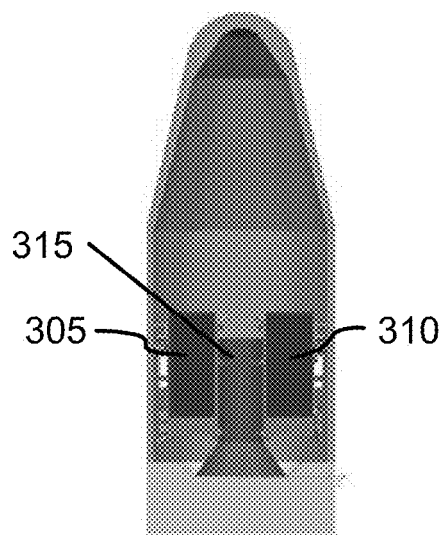
FIG. 3A shows a vertical cross-section of two Galileo spacecraft in a side-by-side dual-launch configuration.
Figure 3B:
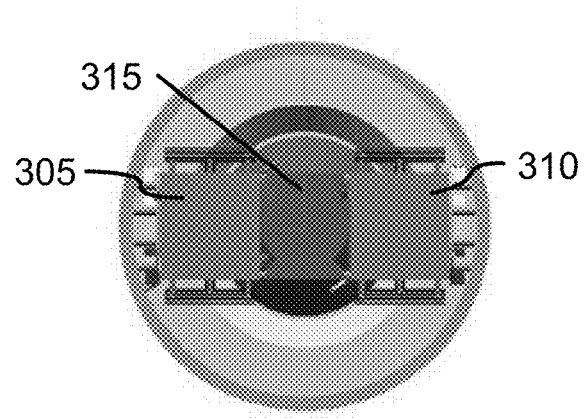
FIG. 3B shows a horizontal cross-section of two Galileo spacecraft in a side-by-side dual-launch configuration.

As an example of a satellite application that utilizes multiple small spacecraft within a fairing, reference can be made back to FIGS. 3A and 3B. The Galileo spacecraft 305 and 310, which are Medium Earth-Orbit (MEO) navigation spacecraft, can be generally categorized as small spacecraft. The spacecraft does not interface to the standard-size 1194 mm core cylinder structure and 1194 mm clamp-band adaptor. Rather, as previously indicated, the dual-launch arrangement includes a custom adaptor 315 that is sandwiched between the two spacecraft 305 and 310. If the spacecraft 305 and 310 were to include a center cylinder, it would likely be oriented laterally to efficiently carry a launch load. Because the custom dual-launch adaptor 315 mounts between the two spacecraft 305 and 310, the spacecraft 305 and 310 cannot accommodate antennas or other payload elements on what would be the east and west sides for a GEO spacecraft.

Figure 5:
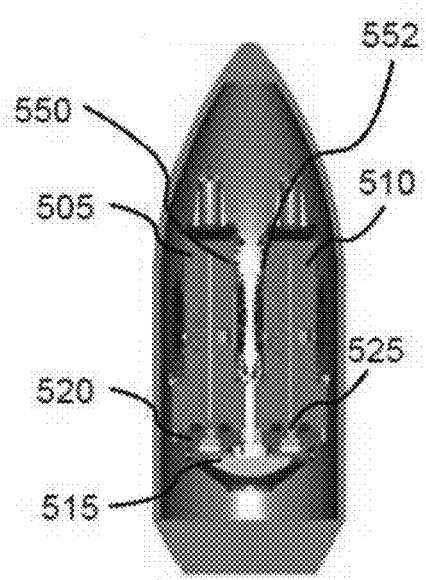
FIGS. 5 and 6 are vertical cross-sections of a Falcon 9 fairing and a Proton-M 5-m fairing, respectively, showing exemplary side-by-side launch configurations within each fairing, according to certain aspects of the present disclosure.
Figure 6:
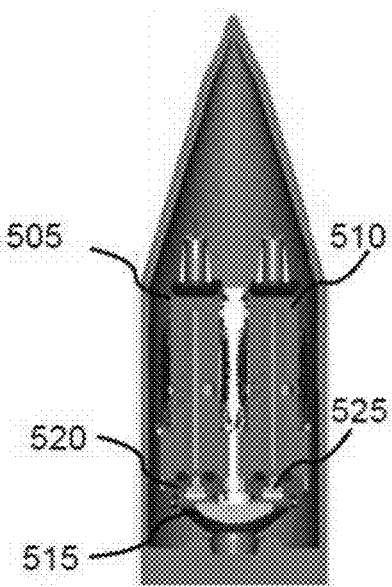

FIGS. 5 and 6 are vertical cross-sections of a Falcon 9 fairing and a Proton-M 5-m fairing, respectively, showing exemplary side-by-side dual-launch configurations within each fairing, according to certain aspects of the present disclosure. Each fairing contains within it a first spacecraft 505 and a second spacecraft 510. In contrast to a vertically stacked dual-launch configuration, the two spacecraft 505 and 510 are positioned side-by-side and mounted on an adaptor fixture 515 by a core cylinder structure 520 and 525 corresponding to each spacecraft 505 and 510. Each spacecraft 505 and 510 can utilize a standard-size 1194 mm core cylinder structure. Separation planes of the first and second spacecraft 505 and 510 are at about the same longitudinal position within the fairing. Lateral positions of the first and second spacecraft 505 and 510 allow sufficient clearance to ensure that the spacecraft do not interfere with each other (e.g., to prevent contact of the spacecraft) during launch, since the spacecraft vibrate during launch. The GEO spacecraft 400 shown in FIGS. 4A through 4C can be utilized as one of the two spacecraft 505 and 510 shown in FIGS. 5 and 6. The adaptor fixture 515 may include two standard 1194 mm clamp-band adaptor systems, or any equivalent separation system that can interface to a spacecraft core cylinder of approximately 1194 mm diameter.

With reference to FIGS. 4A through 4C, 5 and 6, in one or more implementations of the present disclosure, an arrangement for spacecraft positioned in a side-by-side configuration is provided. The arrangement includes a dual-launch adaptor (e.g., 515 in FIG. 5), a first spacecraft (e.g., 505 in FIG. 5) mounted on the dual-launch adaptor by a first core cylinder structure (e.g., 520 in FIG. 5) corresponding to the first spacecraft, and a second spacecraft (e.g., 510 in FIG. 5) mounted on the dual-launch adaptor by a second core cylinder structure (e.g., 525 in FIG. 5) corresponding to the second spacecraft. Each spacecraft includes at least one antenna mounted along a first side and a second side of the spacecraft, where the second side is opposite the first side. Each spacecraft has an aspect ratio in a range from 0.55 to 0.80.

In one or more implementations, a first spacecraft (e.g., 505 in FIG. 5) has a first side (e.g., 550) that faces a first side (e.g., 552) of a second spacecraft (e.g., 510). In one example, one or more payload components (e.g., one or more antennas) are mounted on the first side of the first spacecraft but not on the first side of the second spacecraft. In another example, one or more payload components are mounted on the first side of the first spacecraft, and one or more payload components are mounted on the first side of the second spacecraft. In one example, the first side of the first spacecraft directly faces the first side of the second spacecraft. In one example, the first side of the first spacecraft is parallel to the first side of the second spacecraft. In one example, the first side of the first spacecraft faces the first side of the second spacecraft without any obstructions except for any one or more payload components attached to the first side of the first spacecraft and/or the first side of the second spacecraft.

In one or more implementations, either one or both spacecraft (e.g., 505, 510 in FIG. 5) may have less than two antennas. In one example, a spacecraft may have only one antenna. In one example, a spacecraft may have one antenna mounted on a side of a spacecraft. In one example, a spacecraft may have one antenna mounted on an east or west panel of a spacecraft. In one example, a spacecraft may have one antenna mounted on the earth deck.

In one or more implementations, a dual-launch adaptor is below and not between the first and second spacecraft. In one example, a dual-launch adaptor is not located in the space between the first and second spacecraft along the spacecraft height. In one example, a dual-launch adaptor does not occupy the space (e.g., greater than 40%, 50%, 60%, 70%, 80%, or 90% of the space) between a first side of the bus of a first spacecraft and a first side of the bus of a second spacecraft, where the first side of the bus of the first spacecraft and the first side of the bus of the second spacecraft face each other. In one or more implementations, a dual-launch adaptor may be comprised of one or more units. In one or more implementations, the first and second core cylinder structures do not occupy the space between the first and second spacecraft along the spacecraft height. In one or more implementations, the first core cylinder structure is enclosed by the first spacecraft, and the second core cylinder structure is enclosed by the second spacecraft.

An advantage of the side-by-side configuration is that the spacecraft height can be well in excess of 3.5 m possible for the stacked design in the Falcon and Proton fairings, and greater than 2.6 m possible for a stacked launch of the Ariane 5. The side-by-side spacecraft design, in one or more implementations of the present disclosure, can accommodate larger aperture and longer focal length antennas than is possible with a stacked design. For example, the spacecraft in the side-by-side spacecraft design can have a height of 5 m (200 inches). In GEO applications, a taller spacecraft is generally utilized in order to allow for larger antennas, where larger antennas are generally associated with larger antenna apertures and longer focal lengths.

Furthermore, unlike the stacked design, the two spacecraft in the side-by-side design can include earth-deck mounted antennas or remote-sensing instruments. Compared to the stacked design, the increased antenna compatibility and ability to accommodate earth-deck mounted antennas or remote-sensing instruments on both spacecraft generally make it easier to find co-passengers for a side-by-side dual launch. As previously indicated, the lower position spacecraft (e.g., 205) is specifically designed, as compared to a spacecraft with no spacecraft mounted on top of it, to be sufficiently strong so as to support the upper position spacecraft (e.g., 210). Accordingly, in the stacked design, only the upper spacecraft can include earth-deck mounted antennas or remote-sensing instruments.

As will be described, in accordance with one or more implementations of the present disclosure, each spacecraft in the side-by-side configuration can utilize the same corecylinder structure and propulsion system as does a standard GEO communications spacecraft, with customization to reduce the cross-section aspect ratio. This similarity between the side-by-side design and a standard GEO spacecraft design enables one to use standard parts, which reduces cost. As already shown, standard fairings such as the Falcon 9 fairing and the Proton-M 5-m fairing can be utilized to encapsulate the dual-launch spacecraft. Standard-size core cylinder structures can also be utilized and mounted on a standard-size adaptor. By utilizing standard-size structures, designing and construction costs of a satellite can be reduced as compared to custom designing these structures, since the standard-size structures are more readily available and have already undergone extensive testing for various spacecraft applications. The utilization of standard parts can also simplify the design and construction process of the spacecraft.

Figure 7:
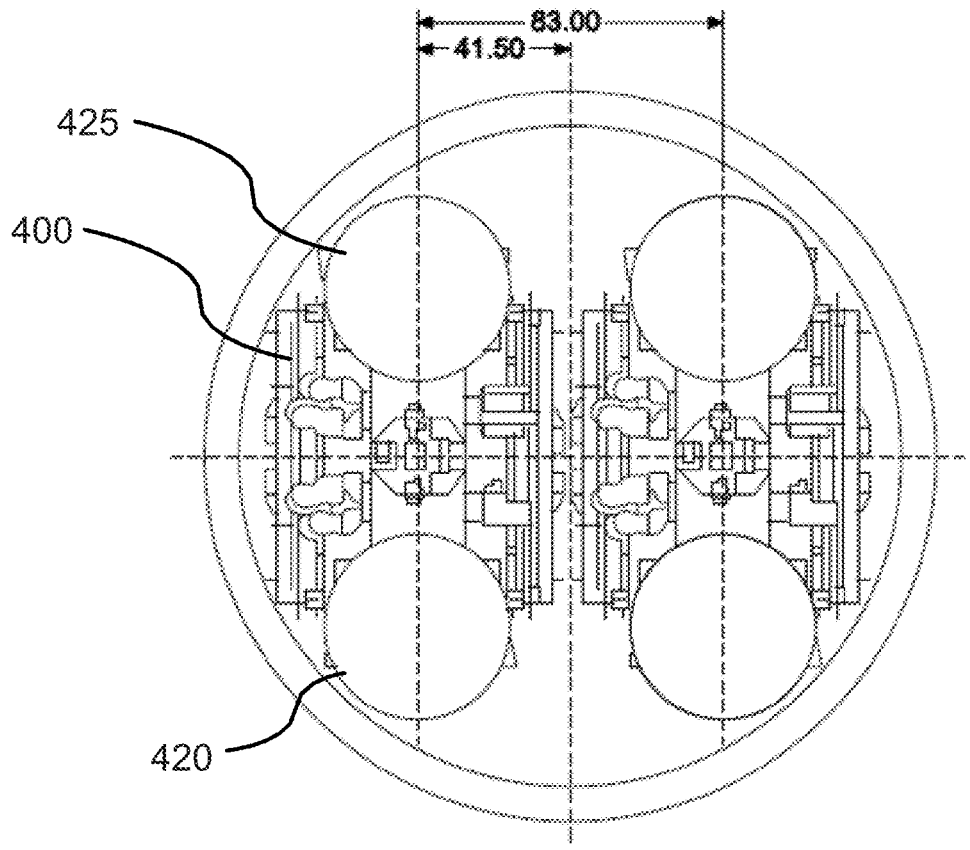
FIG. 7 illustrates a horizontal cross-section showing an exemplary side-by-side launch configuration within a Proton-M 5-m fairing, according to certain aspects of the present disclosure.

FIG. 7 illustrates a horizontal cross-sectional view of an exemplary side-by-side launch configuration within a Proton-M 5-m fairing, according to certain aspects of the present disclosure. Two spacecraft are positioned side-by-side within the 4.57 m (180 in) diameter fairing. An example value between a center of the core cylinder structures of the two spacecraft along the y-direction is about 2.10 m (83.0 in). An example value between a center of the core cylinder structures and the fairing center-line along the y-direction is about 1.05 m (41.5 in). Example values for size of a spacecraft along the y-direction and the z-direction are about 1.30 m (51.2 in) and 2.10 m (82.7 in), respectively. A resulting aspect ratio for each of these spacecraft is about 0.62. It is understood that for a given fairing diameter, which may be 4.57 m (nominal 5-m fairing usable diameter per the above example), or larger (e.g., 5.5 m), or smaller (e.g., 4 m), that the lateral spacing of the two spacecraft for side-by-side launch may be selected to adjust the payload mounting space available on the fairing side and between the two spacecraft.

Figure 8A:
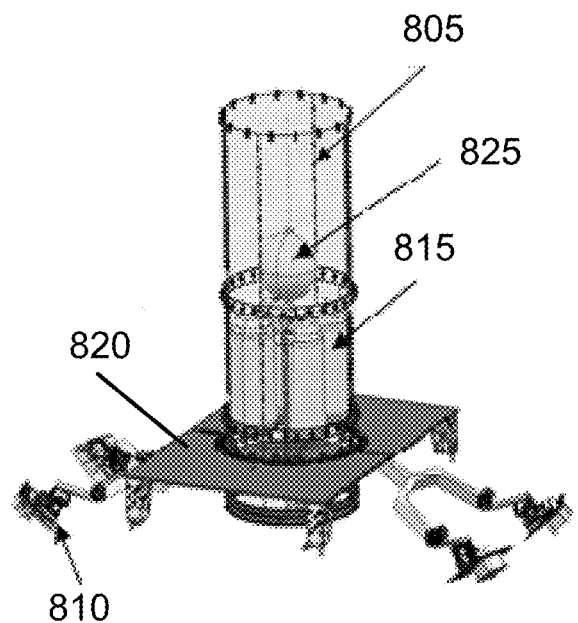
FIG. 8A depicts a standard-size core cylinder structure of an exemplary GEO satellite with a Hall Current Thruster propulsion system.

FIG. 8A depicts a standard-size core cylinder structure 805 of an exemplary GEO spacecraft with a Hall Current Thruster (HCT) propulsion system 810. Four propellant tanks 815, which can be for example Xenon tanks, are mounted inside the core cylinder structure 805, and the HCTs 810 are mounted on articulated arms adjacent to a spacecraft base panel 820. A hydrazine propellant tank 825 can also be mounted inside the core cylinder structure 805. As an alternative to the Xenon tanks, the core cylinder structure 805 can also accommodate hydrazine and oxidizer tanks necessary for a conventional chemical propulsion system, which may include bi-propellant thrusters. In such an arrangement an oxidizer tank may be mounted within the core cylinder structure 805 in a lower position close to the base panel, and a hydrazine (fuel) tank may be mounted directly above the oxidizer tank. Such tanks include cylindrical cross sections with a diameter slightly less than the standard core cylinder structure so as to efficiently use the available volume.

The core cylinder structure 805 is generally about the same diameter as the standard clamp-band adaptor interface (e.g., 1194 mm). The core cylinder structure 805 is generally designed to withstand the launch environment, including acceleration, compression, lateral/bending, and vibration loads. As previously mentioned, the standard-size core cylinder structure 805 can be utilized in each of the two GEO spacecraft that are positioned in a side-by-side configuration. Additionally, the propulsion configuration shown in FIG. 8A can also be utilized in the GEO spacecraft according to one or more implementations of the present disclosure.

Figure 8B:
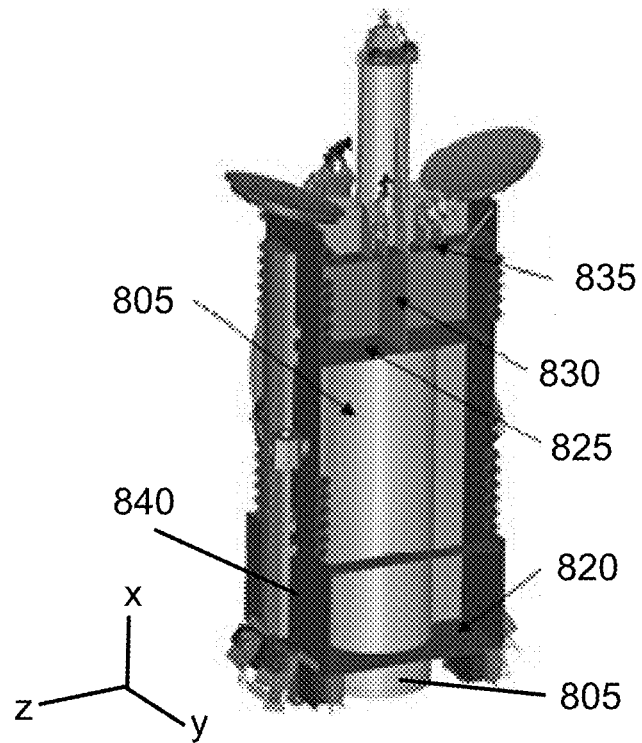
FIG. 8B depicts structural elements of a GEO spacecraft that utilizes the standard-size core cylinder structure shown in FIG. 8A.

FIG. 8B depicts structural elements of a GEO spacecraft that utilizes the standard-size core cylinder structure 805 shown in FIG. 8A. The GEO spacecraft includes the core cylinder structure 805 as also shown in FIG. 8A. The GEO spacecraft also includes a base panel 820, a mid-deck panel 825, an east/west cruciform panel 830, and an earth-deck panel 835. In one or more implementations, an aspect ratio of each GEO spacecraft in the side-by-side-configuration can be reduced by reducing a lateral dimension (e.g., width) of only a few panels, including the base panel 820, mid-deck panel 825, east/west cruciform panel 830, and/or earth-deck panel 835.

For example, compared to a standard spacecraft with an aspect ratio of 1.0 or close to 1.0, at least one or more of the base panel 820, mid-deck panel 825, east/west cruciform panel 830, and earth-deck panel 835 are smaller (e.g., narrower) along a lateral dimension for a GEO spacecraft designed for use in a side-by-side launch configuration. Although the panels 820, 825, 830, and 835 are reduced in size, the core cylinder structure 805 for the GEO spacecraft designed for use in a side-by-side launch configuration can be the same as the core cylinder structure for the standard spacecraft. For example, each of the panels 820, 825, 830, and 835 can have a narrower lateral dimension of no less than about 1.3 m to accommodate a standard-size 1194 mm core cylinder structure.

As shown for example in FIG. 8B, the aspect ratio of a spacecraft may vary along its height (x-axis direction). In the example, the spacecraft is wider at the bottom region 840 and narrower in the region (above the bottom region 840) where the reflectors are stowed. The example widths are 1.84 m (72 in) and 1.27 m (50 in), respectively, where the widths are dimensions along the y-axis. In an aspect, a spacecraft may be made wider (e.g., wider y-axis dimensions) at both the top and the bottom regions with a local narrowing in the region where the reflectors or other payloads would be stowed. The approach may provide the benefit of additional internal mounting area. In another aspect, the north and south panels may be wider than the bus structure. For example, the north and south panels may overhang the east and west panels, as shown in FIGS. 17A through 17G. This is generally possible when using unfurlable reflectors, which when stowed do not occupy the entire east or west sides of the spacecraft. The wider N/S panels (e.g., 1.85 m (73 in) in FIG. 17G) can provide greater thermal dissipation capability compared to narrower panels that are used with larger rigid reflectors.

The spacecraft to be utilized in the side-by-side configuration are desired to have a low cost structure, making use of standard structures appealing. By utilizing standard-sized structures and similarly sized structures for the cylinder core and the adapter and clamp-band system as well as standard fairings, the design and construction costs of a satellite can be reduced as compared to custom designing these structures. On a similar note, by selecting the core cylinder structure and the adaptor and clamp-band system to have diameters that are nominally the same, costs and complexity of the spacecraft design can be reduced.

In accordance with one or more implementations of the present disclosure, each satellite arranged in a side-by-side configuration includes a core cylinder structure with a diameter between 1.14 m (45 in) and 1.22 m (48 in). For example, a standard-size core cylinder structure, such as an 1194 mm (47 inch) standard cylinder, can be utilized in the implementations of the present disclosure. The core cylinder structure is configured to be mounted to a dual-launch adaptor via a clamp band adaptor system. The dual-launch adaptor is in turn attached to the standard launch vehicle interface, which may have a diameter of 1.57 m (e.g., Falcon 9, Atlas V) or 2.62 m (e.g., Proton, Ariane 5). In many example implementations, an 1194 mm standard cylinder can interface with an 1194 mm standard launch vehicle adaptor and clamp-band system. In some implementations, a larger standard cylinder of 1666 mm can be utilized, although such a size would be too large to allow the dimensional constraints previously indicated when utilized with a 5-m fairing. For example, a spacecraft that utilizes a standard cylinder of 1666 mm might be too wide in the y-axis dimension to accommodate side-mounted E/W reflectors within the 5-m fairing. However, a larger diameter fairing (e.g., a 6-m fairing) can be utilized to accommodate the larger standard cylinder of 1666 mm and the dimensional constraints previously indicated.

Figure 9A:
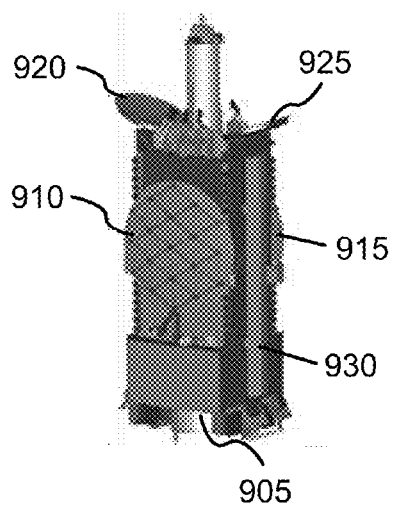
FIGS. 9A and 9B depict two views of a GEO spacecraft in a stowed configuration, according to certain aspects of the present disclosure.
Figure 9C:
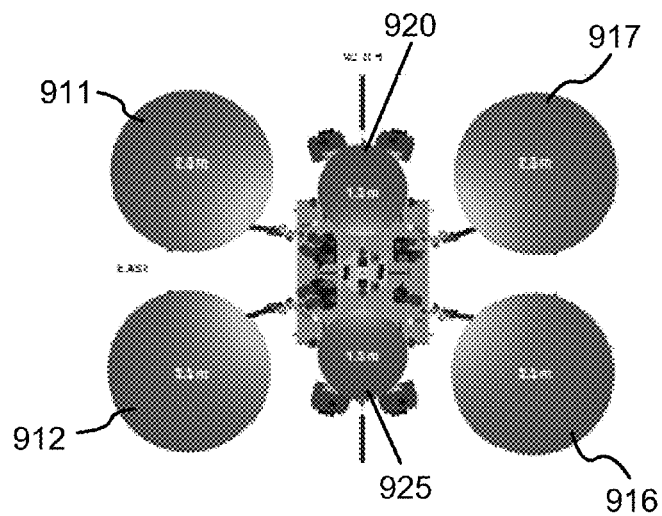
FIGS. 9C and 9D depict a top view and a perspective view, respectively, of the GEO spacecraft of FIGS. 9A and 9B in a deployed configuration, according to certain aspects of the present disclosure.
Figure 9B:
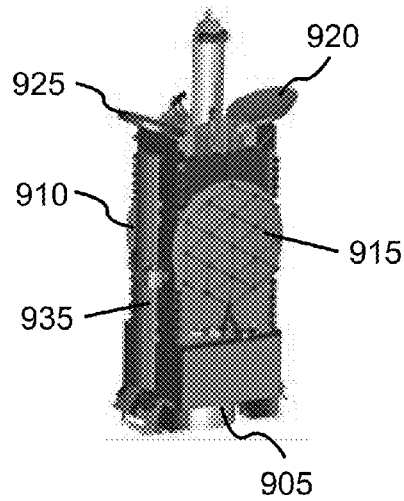

FIGS. 9A and 9B depict two views of a GEO spacecraft in a stowed configuration, according to certain aspects of the present disclosure. The GEO spacecraft includes a core cylinder structure 905. In this example, the spacecraft includes a first set 910 and a second set 915, each set including two 2.3 m antennas. The first set 910 is mounted on one side (e.g., the east side), and the second set 915 is mounted on the other side (e.g., the west side). The spacecraft also includes two 1.3 m antennas 920 and 925 mounted on the earth deck of the GEO spacecraft. In the case with two antennas mounted on each of the east and west sides of the GEO spacecraft, the east and west sides can mount antennas with aperture sizes up to 2.5 m with rigid reflectors. Antennas of larger sizes are possible with unfurlable reflectors. The GEO spacecraft generally also includes a solar array 930 and 935. An example f-number for the antennas in the first and second sets 910 and 915 is an F/D of 1.4. An example f-number for the antennas 920 and 925 mounted on the earth deck is an F/D of 1.2.

Figure 9D:
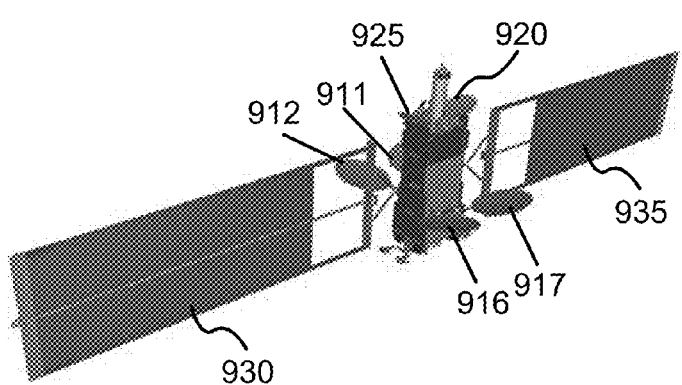

FIGS. 9C and 9D depict a top view and a perspective view, respectively, of the GEO spacecraft of FIGS. 9A and 9B in a deployed configuration, according to certain aspects of the present disclosure. As shown in FIGS. 9C and 9D, each of the first and second sets 910 and 915 of antennas, shown in FIGS. 9A and 9B, includes two antennas. In particular, the first set 910 includes antennas 911 and 912 whereas the second set 915 includes antennas 916 and 917. The antennas 920 and 925 mounted on the earth deck of the GEO satellite and the solar arrays 930 and 935 are also shown in FIGS. 9C and 9D. FIG. 9C shows example reflector sizes for each of the antennas, as described above with reference to FIGS. 9A and 9B.

Figure 10A:
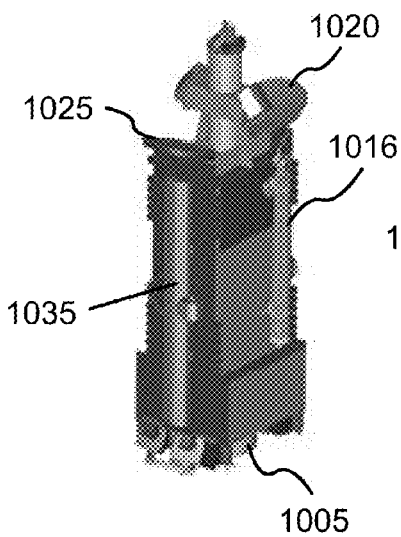
FIG. 10A depicts an exemplary GEO spacecraft in a stowed configuration, according to certain aspects of the present disclosure.

FIG. 10A depicts an exemplary GEO spacecraft in a stowed configuration, according to certain aspects of the present disclosure. FIG. 10B depicts two GEO spacecraft of FIG. 10A stowed within a fairing, according to certain aspects of the present disclosure.

Figure 10C:
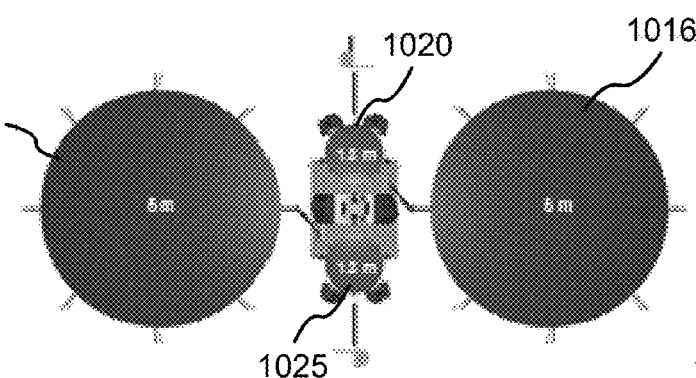
FIGS. 10C and 10D depict top and perspective views of the exemplary GEO spacecraft in a deployed configuration, according to certain aspects of the present disclosure.
Figure 10B:
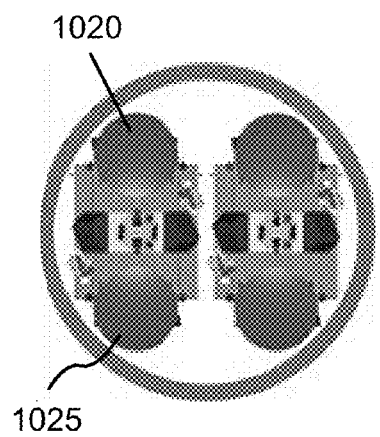
FIG. 10B depicts two GEO spacecraft of FIG. 10A stowed within a fairing, according to certain aspects of the present disclosure.
Figure 10D:
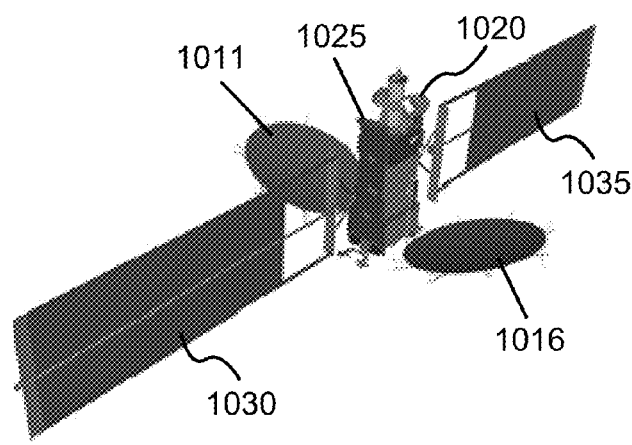

FIGS. 10C and 10D depict top and perspective views of the exemplary GEO spacecraft in a deployed configuration, according to certain aspects of the present disclosure. As shown in FIGS. 10A through 10D, the GEO spacecraft includes a first side-mounted antenna 1011, a second side-mounted antenna 1016, a first earth-deck mounted antenna 1020, and a second earth-deck mounted antenna 1025. The first and second side-mounted antennas 1011 and 1016 utilize unfurlable reflectors that fold up into a compact bundle that stows against the east and west sides of the GEO spacecraft. The GEO spacecraft also includes solar arrays 1030 and 1035. As an example, each of the side-mounted antennas 1011 and 1016 can have a diameter of 5 m and an F/D of 1. Focal lengths up to 7 m are possible by changing the reflector boom configuration. Each of the earth-deck mounted antennas 1020 and 1025 can have a diameter of 1.3 m.

Figure 11C:
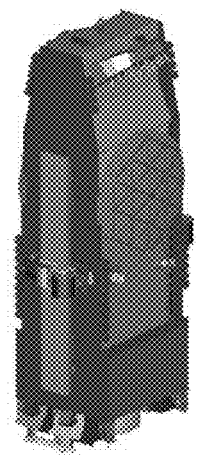
Figure 11C:
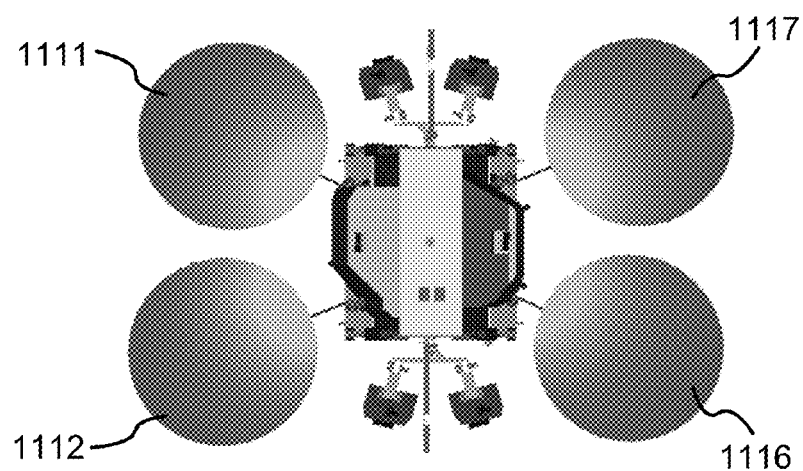
Figure 11C:
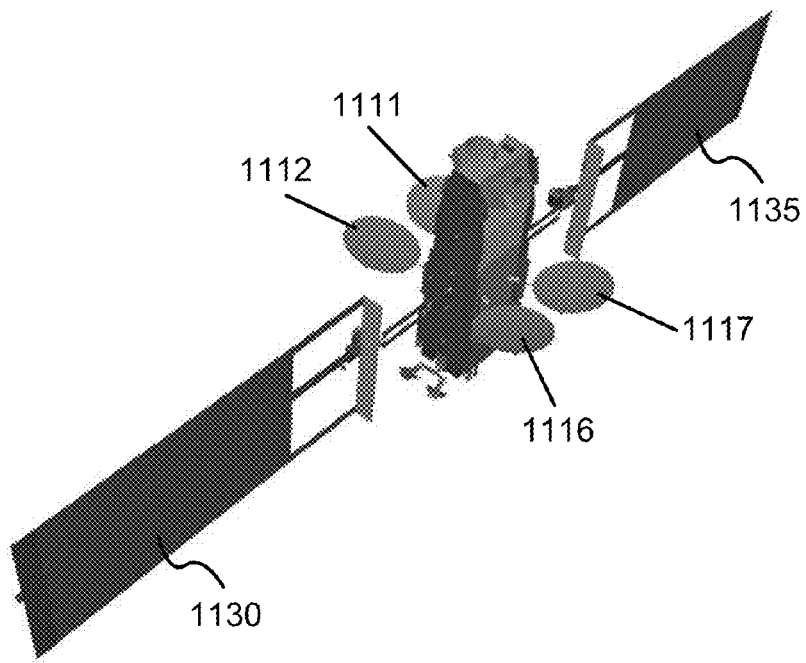

FIG. 11A depicts a view of an example GEO spacecraft in a stowed configuration, according to certain aspects of the present disclosure. FIGS. 11B and 11C depict a top view and a perspective view, respectively, of the GEO spacecraft of FIG. 11A in a deployed configuration, according to certain aspects of the present disclosure. In one or more implementations of the present disclosure, as shown in FIGS. 11A through 11C, the GEO spacecraft of FIGS. 11A through 11C includes two side-mounted antennas on each of the east side (1111, 1112) and west side (1116, 1117) of the GEO spacecraft but are devoid of earth-deck mounted antennas. An example diameter for each side-mounted antenna 1111, 1112, 1116, and 1117 is 2.03 m (80 in). The GEO spacecraft also includes solar arrays 1130 and 1135.

FIGS. 12A through 12C depict an exemplary deployment sequence for a GEO spacecraft in a side-by-side launch configuration, according to certain aspects of the present disclosure. An adaptor 1215 interfaces to a launch vehicle via a launch vehicle interface 1220 of the adaptor 1215. The launch vehicle interface 1220 can be a standard launch vehicle interface, such as a 1.57 m (Falcon 9/Atlas V) or 2.62 m (Proton/Ariane) mounting interface. The system may include 1194 mm clamp-band separation systems, each of which is attached to a spacecraft (e.g., via a 1194 mm core cylinder structure), or may use some other approach such as separation nuts.

As shown in FIG. 12B, prior to deployment, a palate 1225 and 1230 supporting a respective spacecraft 1205 and 1210 may rotate, such that the spacecraft can be deployed longitudinally using standard kick-off springs without contacting each other. With this arrangement, it is possible that a single palate rotates, rather than both. Other arrangements are possible where the separation springs produce a lateral force that can separate the spacecraft 1205 and 1210, without utilizing rotating palates. FIG. 12C shows the first spacecraft 1205 separating from the adaptor 1220. Also, because the co-passengers will in general have different wet mass, the adaptor 1220 may include a provision for adding balance mass or for adjusting the lateral position of each spacecraft 1205 and 1210, to allow adjustment of the total system center-of-mass (spacecraft plus adaptor) as necessary to meet launch vehicle requirements. Furthermore, fuel can be added to the lighter spacecraft to shift the center-of-mass of the total dual-launch system (two spacecraft plus dual-launch adaptor) closer to the launch vehicle center-line.

In one or more implementations, the two spacecraft positioned in a side-by-side configuration are not identical with each other. For example, spacecraft size, antenna size (e.g., side antenna size, earth-deck antenna size), dry mass, and other measurements need not be the same between the two spacecraft.

Figure 13A:
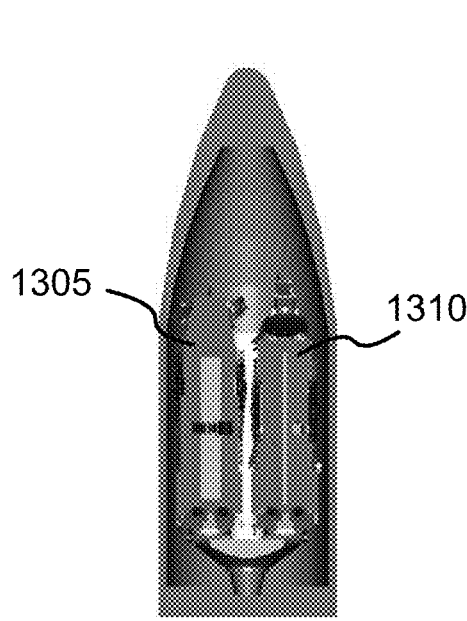
FIGS. 13A through 13C shows a vertical cross-sectional view, a perspective view, and a horizontal cross-sectional view of a side-by-side dual-launch configuration, where GEO spacecraft are non-identical, according to certain aspects of the present disclosure.
Figure 13B:
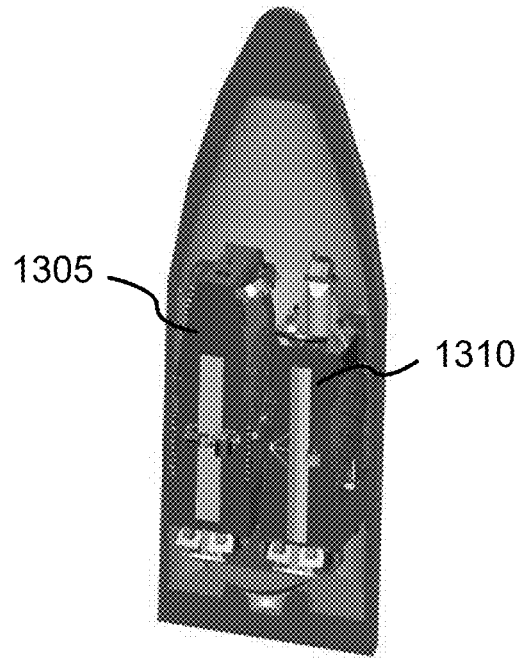
Figure 13C:
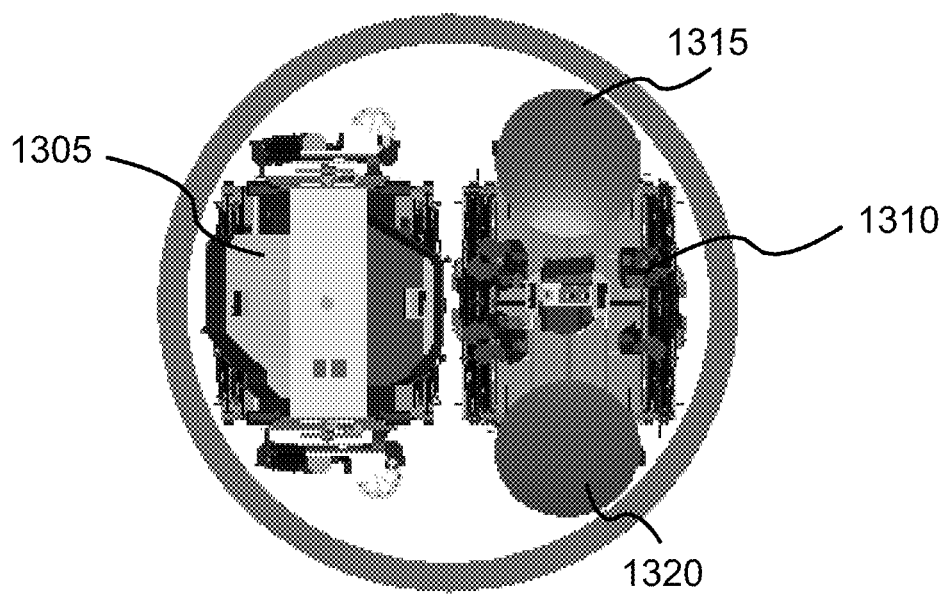

FIGS. 13A through 13C illustrates a vertical cross-sectional view, a perspective view, and a horizontal cross-sectional view of a side-by-side dual-launch configuration, where GEO spacecraft are non-identical, according to certain aspects of the present disclosure. In particular, in FIGS. 13A through 13C, a first spacecraft 1305 is not identical to a second spacecraft 1310. As one example, the second spacecraft 1310 includes earth-deck mounted antennas 1315 and 1320 whereas the first spacecraft 1305 does not include earth-deck mounted antennas. Additionally, as shown in FIGS. 13A through 13C, the height of the first spacecraft 1305 and the second spacecraft 1310 are different from each other. Since the spacecraft 1305 and 1310 have different components (e.g., antennas), the dry mass of the spacecraft 1305 and 1310 are generally different.

FIGS. 14A through 14C depict an exemplary deployment sequence for a GEO satellite in a side-by-side launch configuration, according to certain aspects of the present disclosure. The deployment sequence is similar to that of FIGS. 12A through 12C, except that two GEO spacecraft positioned in the side-by-side launch configuration are non-identical.

FIG. 15 shows a graph that provides dual-launch GEO mission performance, according to certain aspects of the present disclosure. In particular, the dry mass of a single spacecraft, the orbit transfer time, and the total wet mass of the two spacecraft in the dual-launch configuration are provided. A spacecraft dry mass of over 2,600 kg can be achieved on an Atlas V551 launch vehicle. A corresponding wet mass of 7,225 kg can be utilized on the Atlas V551 launch vehicle.

In one or more implementations of the present disclosure, for a Falcon 9 or Proton-M launch, a representative spacecraft height from the separation plane to the earth deck is about 5.2 m, or about 1.7 m taller than the height of the stacked design, which is 3.5 m. For the Ariane 5 launch above the SYLDA+1500 mm, a side-by-side launch spacecraft would have a height between 3.2 and 5 m depending on the antenna configuration. This assumes a dual-launch adaptor height of about 1 m above the standard 1.57 m or 2.62 m launch vehicle interface ring. For launch in the Ariane 5 lower position, the small fairing diameter (4 m compared to 4.6 m) and the shorter height constraint, as shown in FIG. 1A, limits the allowable spacecraft height and antenna sizes over what is possible in the upper position. With the side-by-side spacecraft, a wide range of antenna arrangements is possible. For example, the spacecraft of FIGS. 10A through 10D includes two 5-m antennas with an F/D of 1.0. Focal lengths up to 7.0 m are possible by changing the reflector boom configuration.

As shown in Table 4, a spacecraft dry mass up to about 2,600 kg can be achieved with a spacecraft to be utilized in a side-by-side dual-launch arrangement according to one or more implementations the present disclosure, depending on the launch vehicle. Higher spacecraft dry mass (e.g., up to 3,500 kg) than those shown in Table 4 can also be achieved. Note that these are representative maximum mass values. However, the dry mass that can be achieved in a given case depends on the spacecraft propulsion efficiency, dual-launch adaptor mass, mission velocity-change requirements and other factors. Table 4 also gives the payload system mass, which is the launch mass necessary to achieve the given dry mass. The payload system mass includes two spacecraft with all propellants and a dual-launch adaptor mass penalty of 326 kg for Ariane and Falcon 9 and 450 kg for Atlas V and Proton-M. This penalty represents the additional adaptor mass not included in the standard launch vehicle performance predictions, which generally apply to single launch. The dry mass assumes a Xenon propulsion system is used for both orbit transfer and stationkeeping. Conventional chemical propulsion systems may also be used in a spacecraft design according to the present disclosure. However, the dry mass achieved would be substantially reduced.

TABLE 4

Dry mass to orbit for a spacecraft.

| Launch vehicle | Payload system mass (kg) | Dual-launch spacecraft dry mass (kg) |
| --- | --- | --- |
| Ariane 5 (upper position) | 6,500 | 2,400 |
| Ariane 5 (SYLDA + 1500 mm) | 3,200 | 1,120 |
| Atlas V551 | 7,225 | 2,610 |
| Atlas V541 | 6,600 | 2,350 |
| Proton-M (5-m fairing) | 6,900 | 2,310 |
| Falcon 9 | 6,500 | 2,240 |

Figure 16A:
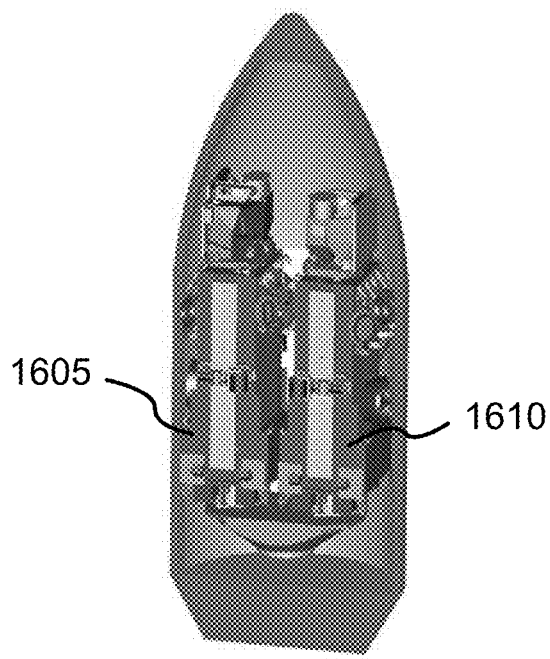
FIG. 16A illustrates a perspective view of a side-by-side dual-launch configuration, according to certain aspects of the present disclosure.
Figure 16B:
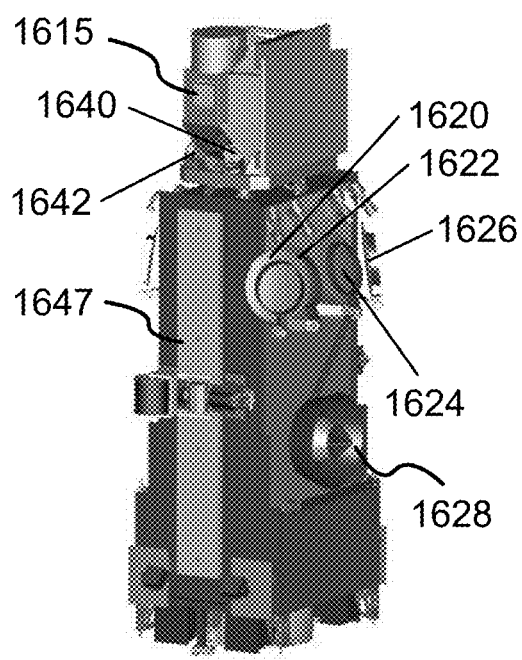
FIGS. 16B and 16C illustrate a first side and a second side, respectively, of an example spacecraft in a stowed configuration, according to certain aspects of the present disclosure.
Figure 16C:
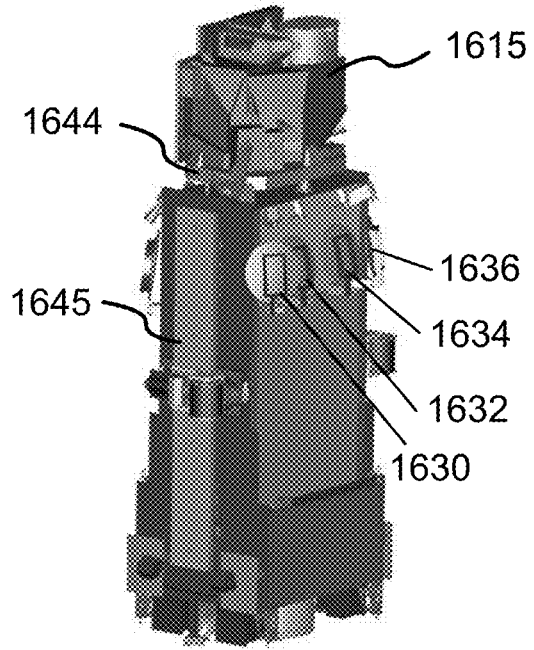
Figure 16D:
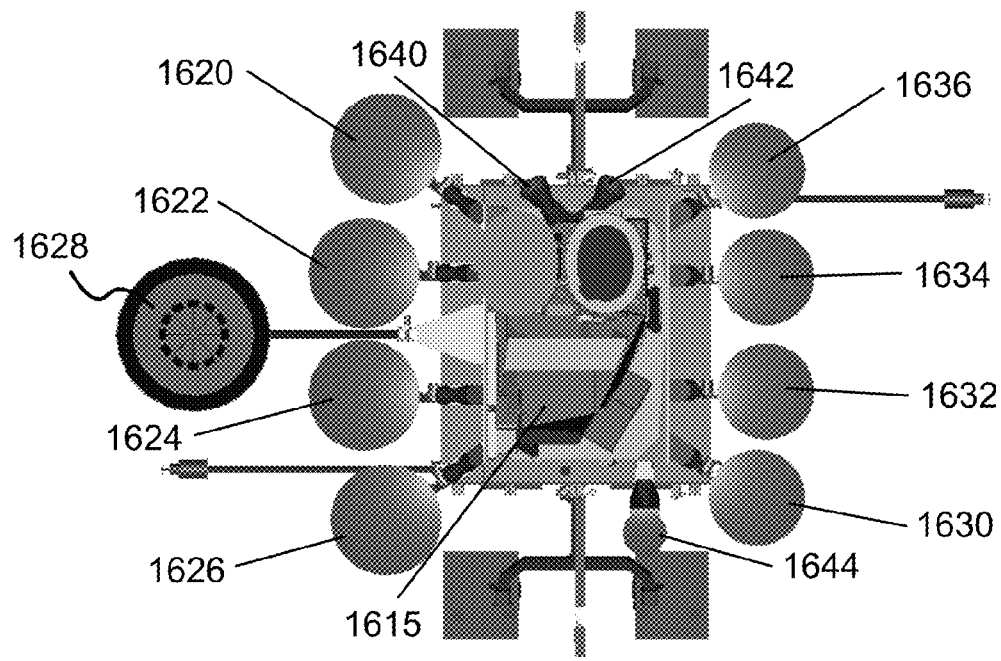
FIGS. 16D and 16E illustrate a top view and a perspective view, respectively, of the spacecraft of FIGS. 16B and 16C in a deployed configuration, according to certain aspects of the present disclosure.
Figure 16E:
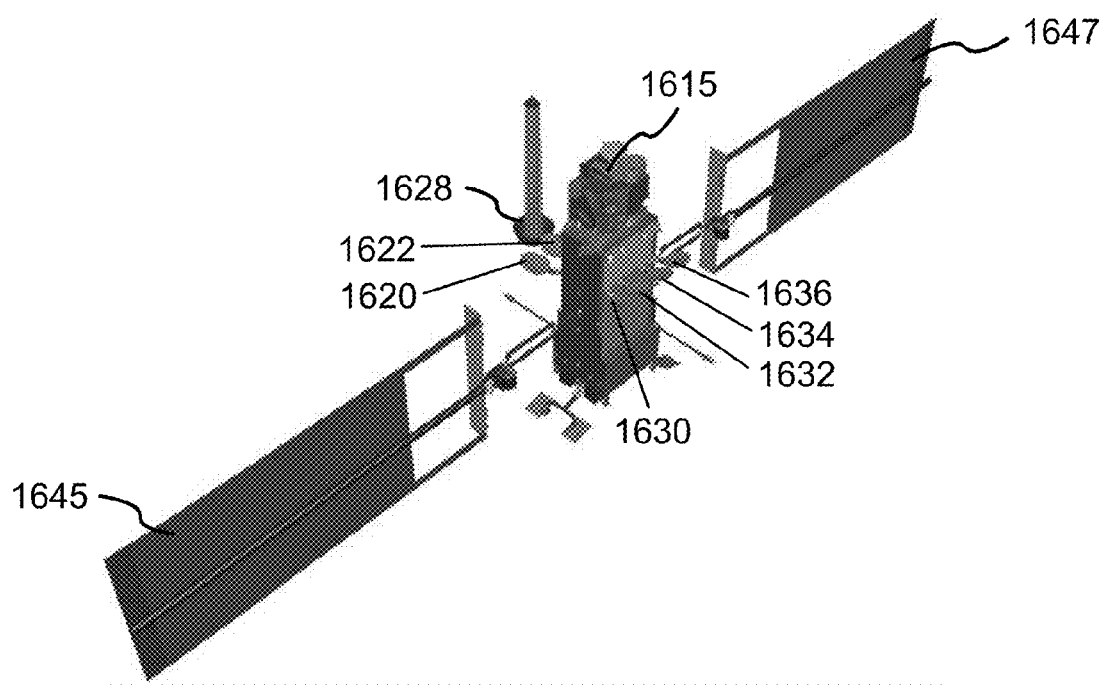

FIG. 16A illustrates a perspective view of a side-by-side dual-launch configuration, according to certain aspects of the present disclosure. The side-by-side dual-launch configuration includes a first spacecraft 1605 and a second spacecraft 1610. The first spacecraft 1605 and the second spacecraft 1610 can be in an Atlas V 5-m Medium or Falcon fairing for example. FIGS. 16B and 16C illustrate a first side and a second side, respectively, of an example spacecraft (e.g., first spacecraft 1605 or second spacecraft 1610) in a stowed configuration, according to certain aspects of the present disclosure. The first side can be facing a +y direction whereas the second side can be facing a −y direction (e.g., east and west sides for a GEO mission). FIGS. 16D and 16E illustrate a top view and a perspective view, respectively, of the spacecraft (e.g., first spacecraft 1605 or second spacecraft 1610) of FIGS. 16B and 16C in a deployed configuration, according to certain aspects of the present disclosure.

A spacecraft (e.g., first spacecraft 1605 or second spacecraft 1610) of FIGS. 16A through 16E includes an earth-observing instrument 1615 that is mounted to the spacecraft earth deck. For example, the earth-observing instrument 1615 can be an Advanced Baseline Imager (ABI) that provides meteorological data. The earth-observing instrument 1615 can be any other kind of remote-sensing instrument, such as a sounder, or an instrument that gathers infrared (IR) images. A side-by-side dual-launch configuration according to various implementations of the present disclosure, including the implementation shown in FIGS. 16A-16E, can mount payload components such as an earth-observing instrument on an earth deck of either or both spacecraft (e.g., 1605 and 1610). In contrast, in a stacked-spacecraft dual-launch configuration, the lower spacecraft is unable to mount a payload component (e.g., earth-observing instrument, earth-deck mounted antennas, etc.) on its earth deck.

A spacecraft (e.g., first spacecraft 1605 or second spacecraft 1610) of FIGS. 16A through 16E also includes a side-mounted antenna arrangement that includes a multiplicity of antennas. The first side includes side-mounted antennas 1620, 1622, 1624, 1626, and 1628. The side-mounted antennas 1620, 1622, 1624, and 1626 can be X-band steerable antennas with an aperture diameter of 0.76 m (30 in). The side-mounted antenna 1628 can be an ultra-high frequency (UHF) helix antenna. The second side includes side-mounted antennas 1630, 1632, 1634, and 1636. The side-mounted antennas 1630, 1632, 1634, and 1636 can be Ka-band steerable antennas with an aperture diameter of 0.66 m (26 in).

The spacecraft (e.g., first spacecraft 1605 or second spacecraft 1610) also includes earth-deck mounted payload components 1640, 1642, and 1644. The earth-deck mounted horns 1640 and 1642 can be, for example, Ka-band horns. The earth-deck mounted antenna 1644 can be a Ka-band steerable antenna with an aperture diameter of 0.30 m (12 in). The spacecraft (e.g., first spacecraft 1605 or second spacecraft 1610) also includes solar arrays 1645 and 1647.

The spacecraft (e.g., first spacecraft 1605 or second spacecraft 1610) of FIGS. 16A through 16E can be, for example, a HEO spacecraft that operates in a Triple Apogee Orbit (TAP), and that is intended to provide communications and weather data for the Arctic region. The TAP orbit nominally has a period of 16 hours, an inclination of 63.4 degrees, an apogee altitude of 43,497 km, a perigee altitude of 8,102 km, and an argument of perigee of 270 degrees. A similarly configured spacecraft could operate in orbits including GEO, MEO, or HEOs such as Tundra orbits (24 hour period) or Molniya orbits (12 hour period).

In accordance with one or more implementations, an aspect ratio between about 0.55 and 0.8 can enable the accommodation of different kinds of side-mounted payload components. For example, a spacecraft can have on either or both sides (e.g., east and west sides) a single side-mounted antenna (e.g., 1011 in FIG. 10C), two side-mounted antennas (e.g., 1111 and 1112 in FIG. 11B), or a greater number of smaller side-mounted antennas (e.g., 1620, 1622, 1624, and 1626 in FIG. 16D and/or 1630, 1632, 1634, and 1636 in FIG. 16D). It is noted that other kinds of payload components deployed on either or both sides, such as space weather instruments, are within the scope of the present disclosure.

Figure 17A:
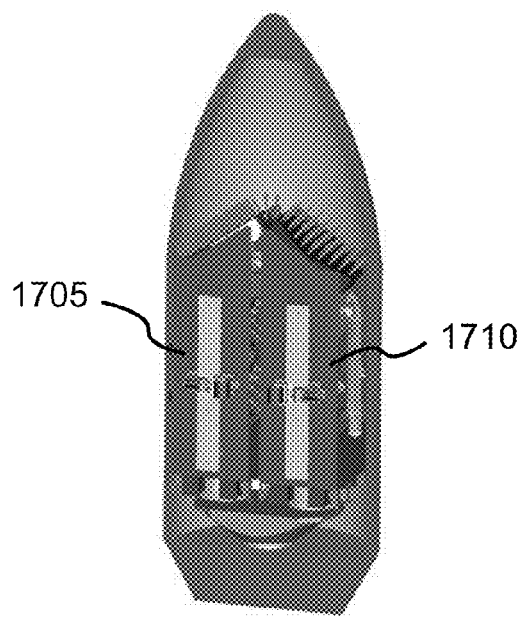
FIG. 17A illustrates a perspective view of a side-by-side dual-launch configuration that includes a first spacecraft and a second spacecraft, according to certain aspects of the present disclosure.
Figure 17B:
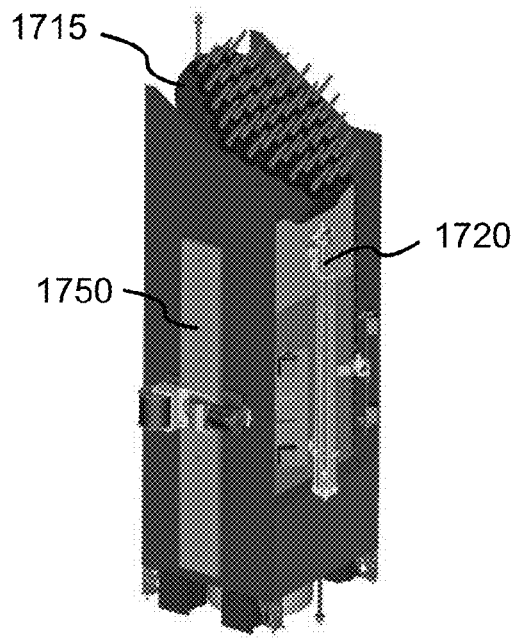
FIG. 17B illustrates a first side of a spacecraft in a stowed configuration, according to certain aspects of the present disclosure.
Figure 17C:
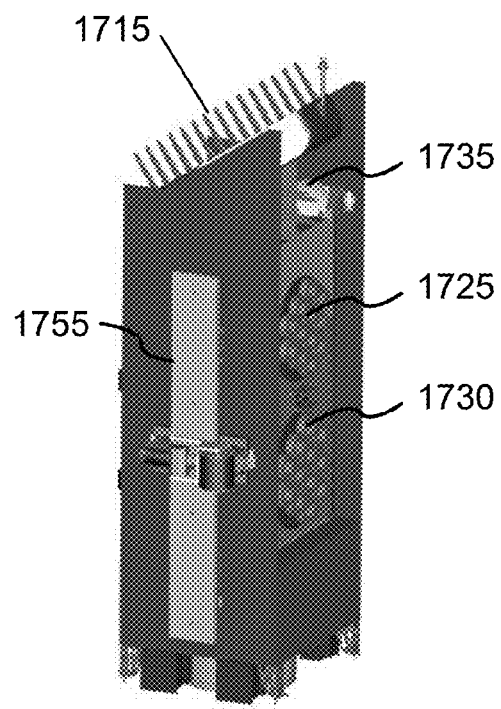
FIGS. 17C and 17D illustrate a second side of the first spacecraft and a second side of the second spacecraft, respectively, in a stowed configuration, according to certain aspects of the present disclosure.
Figure 17D:
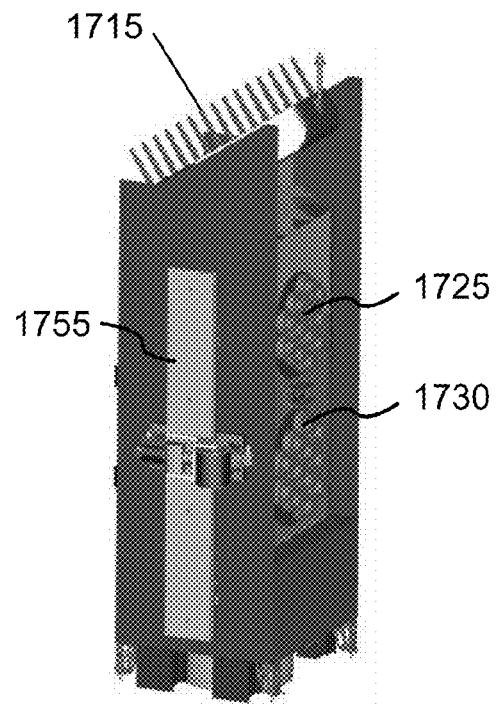
Figure 17E:
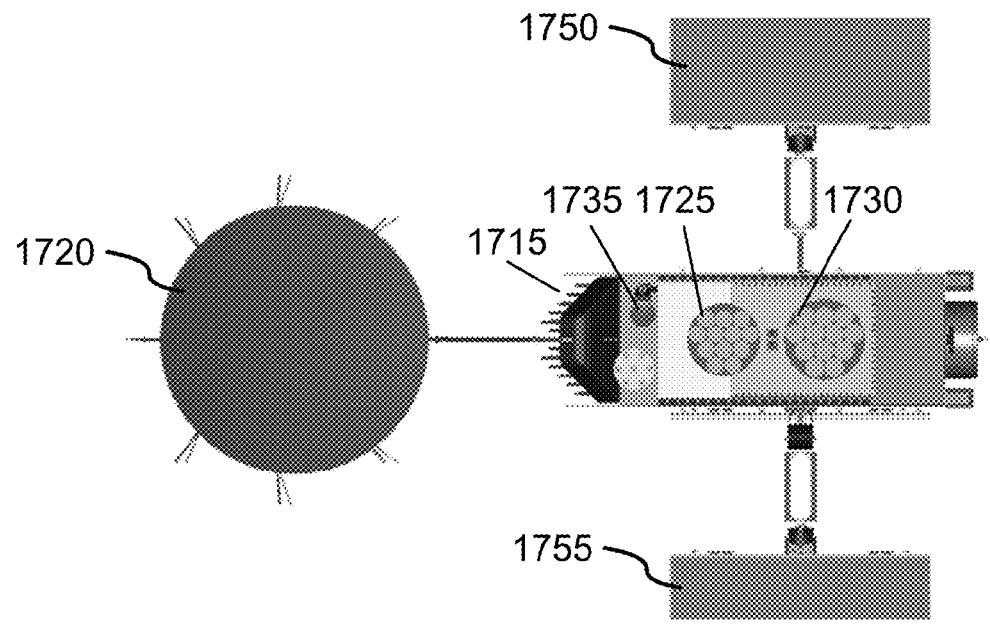
FIGS. 17E and 17F illustrate a top view and a perspective view, respectively, of the first spacecraft in a deployed configuration, according to certain aspects of the present disclosure.
Figure 17F:
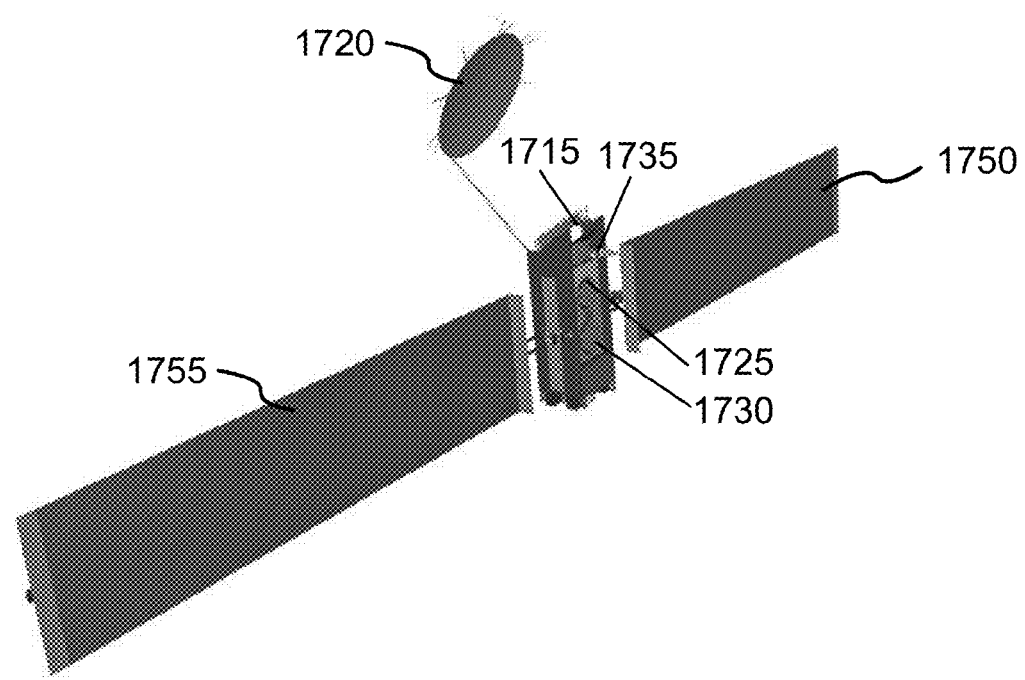
Figure 17G:
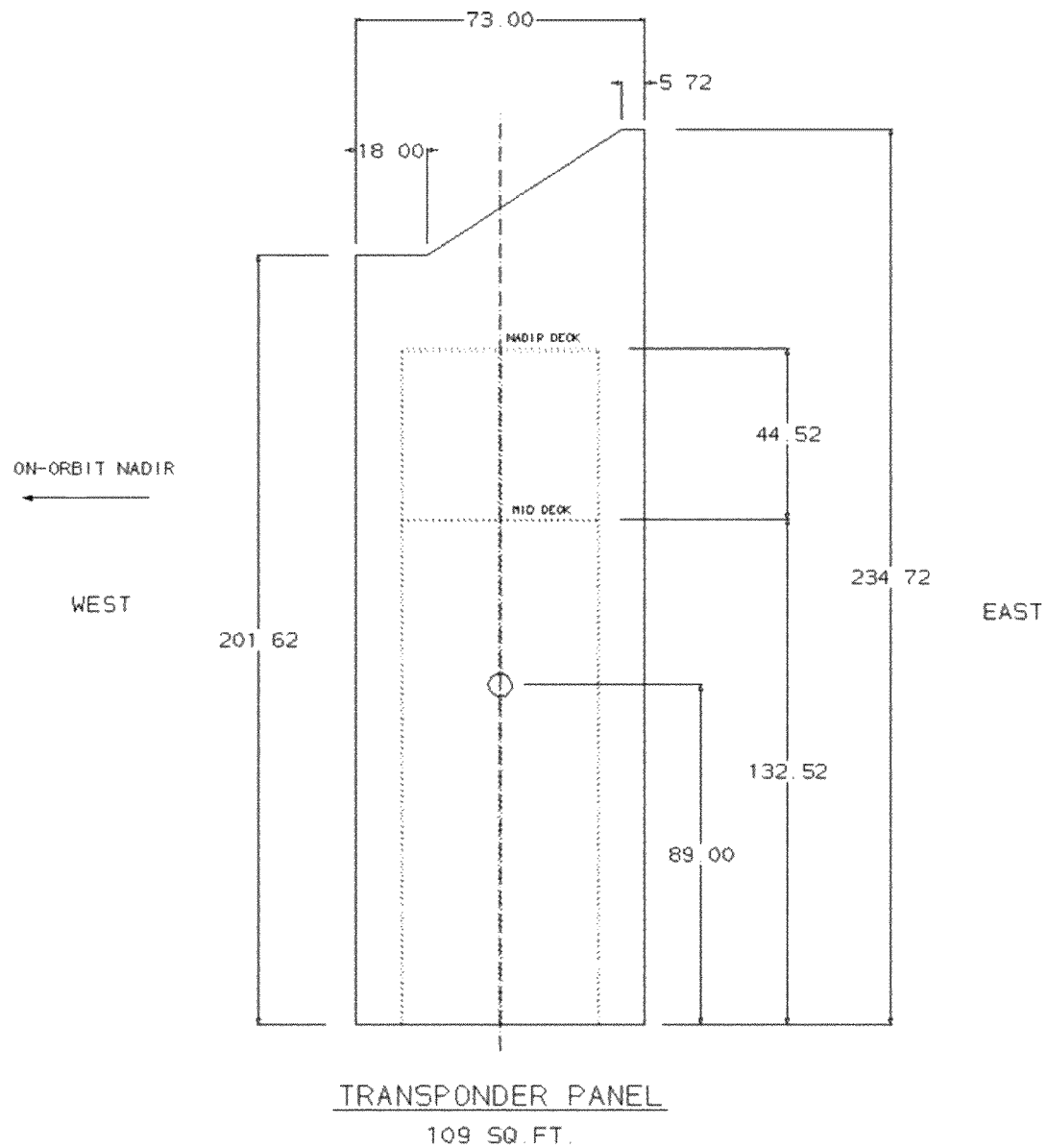
FIG. 17G shows example dimensions for a spacecraft.

FIG. 17A illustrates a perspective view of a side-by-side dual-launch configuration, according to certain aspects of the present disclosure. The side-by-side dual-launch configuration includes a first spacecraft 1705 and a second spacecraft 1710. The first spacecraft 1705 and the second spacecraft 1710 can be in a Proton-M 5-m, Atlas V 5-m Medium, or Falcon fairing for example. FIG. 17B illustrates a first side of a spacecraft (e.g., first spacecraft 1705 or second spacecraft 1710) in a stowed configuration, according to certain aspects of the present disclosure. FIGS. 17C and 17D illustrate a second side of the first spacecraft 1705 and a second side of the second spacecraft 1710, respectively, in a stowed configuration, according to certain aspects of the present disclosure. FIGS. 17E and 17F illustrate a top view and a perspective view, respectively, of the first spacecraft 1705 in a deployed configuration, according to certain aspects of the present disclosure. FIG. 17G shows example dimensions, in inches unless otherwise indicated, for a spacecraft (e.g., first spacecraft 1705 or second spacecraft 1710).

Each spacecraft (e.g., 1705 and 1710 in FIGS. 17A through 17F) includes a large antenna feed 1715 on the earth deck. The spacecraft 1705 also includes a small payload component 1735 (e.g., a small antenna) mounted on the earth deck. The first side of the spacecraft 1705 and 1710 includes a side-mounted antenna 1720 with an unfurlable reflector. Each of the spacecraft 1705 and 1710 includes several direct-radiating antennas (e.g., 1725 and 1730) mounted on the second side. Each of the spacecraft 1705 and 1710 also includes a solar array 1750 and 1755. It is noted that each of the spacecraft 1705 and 1710 is oriented with respect to the earth differently from a standard GEO spacecraft in that, for the spacecraft 1705 and 1710, the normal east and west faces are the nadir and anti-nadir faces in orbit (e.g., the spacecraft is oriented with a pitch angle of 90 degrees).

The disclosed system and method of mounting two spacecraft side-by-side within a single fairing allow both spacecraft to utilize a taller envelope, thus enabling the use of longer focal length antenna designs and to mount antennas and other equipment to the earth deck, which is possible only on the upper spacecraft in a stacked configuration. The dual-launch design may reduce mission cost by anywhere from $30-$50 M for commercial launches (such as on Falcon, Proton, or Ariane 5). The side-by-side approach may be used in the upper or lower position on the Ariane 5.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these aspects will be readily apparent to those skilled in the art, and generic principles defined herein may be applied to other aspects. Thus, many changes and modifications may be made to the subject technology, by one having ordinary skill in the art, without departing from the scope of the subject technology.

It is understood that the specific order or hierarchy of steps in the processes disclosed is an illustration of exemplifying approaches. Based upon design preferences, it is understood that the specific order or hierarchy of steps in the processes may be rearranged. Some of the steps may be performed simultaneously.

It is noted that dimensional aspects (e.g., spacecraft height, antenna diameter, core cylinder structure diameter) provided above are examples and that other values for the dimensions can be utilized in accordance with one or more implementations. Furthermore, the dimensional aspects provided above are generally nominal values. As would be appreciated by a person skilled in the art, each dimensional aspect, such as core cylinder structure diameter, has a tolerance associated with the dimensional aspect.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A reference to an element in the singular is not intended to mean "one and only one" unless specifically stated, but rather "one or more". The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for". Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A Geo-synchronous Earth-Orbit (GEO) side-by-side dual-launch spacecraft arrangement, comprising:
a fairing having a diameter between 4 and 6 meters (m);
a dual-launch adaptor comprising a first interface and a second interface, the first interface being larger than the second interface, the second interface configured to interface to a launch vehicle;
a first GEO spacecraft mounted at the first interface of the dual-launch adaptor by a first core cylinder structure substantially traversing a vertical core of a bus structure of the first GEO spacecraft, wherein the first GEO spacecraft comprises: a first payload component mounted on a first side of the first GEO spacecraft; and a second payload component mounted on a second side of the first GEO spacecraft, wherein the second side of the first GEO spacecraft is opposite the first side of the first GEO spacecraft; and
a second GEO spacecraft mounted at the first interface of the dual-launch adaptor by a second core cylinder structure substantially traversing a vertical core of a bus structure of the second GEO spacecraft, wherein the second GEO spacecraft comprises a third payload component mounted on a first side of the second GEO spacecraft,
wherein each of the first and second GEO spacecraft has an aspect ratio within a range from 0.55 to 0.8, the aspect ratio being a ratio of a size of a corresponding spacecraft along a first lateral dimension and a size of the corresponding spacecraft along a second lateral dimension,
wherein the first and second lateral dimensions are perpendicular to each other and each of the first and second lateral dimensions is perpendicular to, and smaller than, a height of the corresponding spacecraft,
wherein the first GEO spacecraft and the second GEO spacecraft are arranged side by side on the dual-launch adapter and within the fairing, and
wherein a maximum number of spacecraft contained within the fairing is two.

2. The arrangement of claim 1, wherein:
the first side and the second side of the first GEO spacecraft are symmetrical with each other; and
the first side and a second side of the second GEO spacecraft are symmetrical with each other.

3. The arrangement of claim 1, wherein the first side and the second side of the first GEO spacecraft have the same size.

4. The arrangement of claim 1, wherein the first payload component comprises a reflector with a diameter within a range from 2 m to 5 m.

5. The arrangement of claim 1, wherein the first payload component comprises a first reflector and the second payload component comprises a second reflector, the first reflector and the second reflector having the same diameter.

6. The arrangement of claim 1, wherein the height of at least one of the first and second GEO spacecraft is within a range from 3 m to 6 m.

7. The arrangement of claim 1, wherein a dry mass of at least one of the first and second spacecraft is within a range from 1,000 kg to 3,500 kg.

8. The arrangement of claim 1, further comprising at least one payload component mounted on an earth deck of each or either of the first GEO spacecraft and the second GEO spacecraft.

9. The arrangement of claim 8, wherein the at least one payload component comprises a reflector with a diameter within a range from 1.3 m to 1.8 m.

10. The arrangement of claim 1, wherein:
each of the first lateral dimension and the second lateral dimension of the first GEO spacecraft is greater than a diameter of the first core cylinder structure, and
each of the first lateral dimension and the second lateral dimension of the second GEO spacecraft is greater than a diameter of the second core cylinder structure.

11. The arrangement of claim 1, wherein the first core cylinder structure has a diameter within a range from 1.17 m to 1.27 m.

12. The arrangement of claim 11, wherein:
the dual-launch adaptor is located below the first and second GEO spacecraft,
the dual-launch adaptor is not between the first and second GEO spacecraft,
the first core cylinder structure is enclosed by the first GEO spacecraft, and
the second core cylinder structure is enclosed by the second GEO spacecraft.

13. The arrangement of claim 1, wherein the dual-launch adaptor is configured to:
tilt at least one of the first and second spacecraft prior to deployment, and
jettison the at least one tilted spacecraft at an angle relative to a plane defined by the dual-launch adaptor.

14. The arrangement of claim 1, wherein the dual-launch adaptor is configured to add balance mass to adjust a center-of-mass of the arrangement.

15. The arrangement of claim 1, wherein the dual-launch adaptor is configured to adjust a lateral position of one or both of the first spacecraft and the second spacecraft to adjust a center-of-mass of the arrangement.

16. The arrangement of claim 1, wherein at least one or both of the first and second spacecraft are configured to provide propellant tank capacity to allow a wet mass of a respective spacecraft to be increased to adjust a center-of-mass of the arrangement.

17. The arrangement of claim 1, wherein the first and second GEO spacecraft are identical to each other.

18. The arrangement of claim 1, wherein the first and second spacecraft are not identical to each other.

19. The arrangement of claim 1,
wherein the second GEO spacecraft comprises a fourth payload component mounted on a second side of the second GEO spacecraft, wherein the second side of the second GEO spacecraft is opposite the first side of the second GEO spacecraft,
wherein the arrangement comprises:
a first solar array mounted on a third side of the first GEO spacecraft;

a second solar array mounted on a fourth side of the first GEO spacecraft, wherein the fourth side of the first GEO spacecraft is opposite the third side of the first GEO spacecraft;

a third solar array mounted on a third side of the second GEO spacecraft; and a fourth solar array mounted on a fourth side of the second GEO spacecraft, wherein the fourth side of the second GEO spacecraft is opposite the third side of the second GEO spacecraft, wherein the first payload component comprises a first reflector, the second payload component comprises a second reflector, the third payload component comprises a third reflector, and the fourth payload component comprises a fourth reflector, and wherein the first side of the first GEO spacecraft faces the first side of the second GEO spacecraft.

20. A side-by-side dual-launch spacecraft arrangement, comprising:

a fairing having a diameter between 4 and 6 meters (m);

a dual-launch adaptor comprising a first interface and a second interface, the first interface being larger than the second interface, the second interface configured to interface to a launch vehicle;

a first Geo-synchronous Earth-Orbit (GEO) spacecraft mounted at the first interface of the dual-launch adaptor by a first core cylinder structure substantially traversing a vertical core of a bus structure of the first GEO spacecraft; and a second GEO spacecraft mounted at the first interface of the dual-launch adaptor by a second core cylinder structure substantially traversing a vertical core of a bus structure of the second GEO spacecraft, wherein each of the first and second GEO spacecraft has an aspect ratio within a range from 0.55 to 0.8, the aspect ratio being a ratio of a size of a corresponding spacecraft along a first lateral dimension and a size of the corresponding spacecraft along a second lateral dimension, wherein the first and second lateral dimensions are perpendicular to each other, and each of the first and second lateral dimensions is perpendicular to, and smaller than, a height of the corresponding spacecraft, wherein the first GEO spacecraft and the second GEO spacecraft are arranged side by side on the dual-launch adapter within the fairing, and wherein a maximum number of spacecraft contained within the fairing is two.

21. A side-by-side dual-launch spacecraft arrangement, comprising:

a fairing having a diameter between 4 and 6 meters (m);

a dual-launch adaptor comprising a first interface and a second interface, the second interface configured to interface to a launch vehicle;

a first Geo-synchronous Earth-Orbit (GEO) spacecraft mounted at the first interface of the dual-launch adaptor by a first core cylinder structure substantially traversing a vertical core of the first GEO spacecraft, wherein the first GEO spacecraft comprises a first side, wherein the first GEO spacecraft comprises a first payload component attached to the first side of the first GEO spacecraft; and a second GEO spacecraft mounted at the first interface of the dual-launch adaptor by a second core cylinder structure substantially traversing a vertical core of the second GEO spacecraft, wherein the second GEO spacecraft comprises a first side, wherein the first side of the first GEO spacecraft faces the first side of the second GEO spacecraft, wherein each of the first and second GEO spacecraft has an aspect ratio within a range from 0.55 to 0.8, the aspect ratio being a ratio of a size of a corresponding spacecraft along a first lateral dimension and a size of the corresponding spacecraft along a second lateral dimension, wherein the first and second lateral dimensions are perpendicular to each other and each of the first and second lateral dimensions is perpendicular to, and smaller than, a height of the corresponding spacecraft, wherein the first GEO spacecraft and the second GEO spacecraft are arranged side by side on the dual-launch adapter within the fairing, and wherein a maximum number of spacecraft contained within the fairing is two.

22. The arrangement of claim 21, wherein:

the first payload component comprises a first reflector;

the first GEO spacecraft further comprises a second reflector attached to a second side of the first GEO spacecraft opposite the first side of the first GEO spacecraft;

the second GEO spacecraft comprises a third reflector attached to the first side of the second GEO spacecraft, and a fourth reflector attached to a second side of the second GEO spacecraft opposite the first side of the second GEO spacecraft;

the first reflector faces the fourth reflector; and the second reflector and the third reflector face the fairing.

23. The arrangement of claim 22, wherein the first GEO spacecraft further comprises:

a first solar array attached to a third side of the first GEO spacecraft; and a second solar array attached to a fourth side of the first GEO spacecraft, wherein:

the first solar array and the second solar array face the fairing, the third side of the first GEO spacecraft is opposite the fourth side of the first GEO spacecraft, the third side of the first GEO spacecraft is perpendicular to the first side of the first GEO spacecraft and the second side of the first GEO spacecraft, and the fourth side of the first GEO spacecraft is perpendicular to the first side of the first GEO spacecraft and the second side of the first GEO spacecraft.

24. The arrangement of claim 23, wherein:

the size of the first GEO spacecraft along the first lateral dimension is larger than the size of the first GEO spacecraft along the second lateral dimension, the third side of the first GEO spacecraft and the fourth side of the first GEO spacecraft are displaced along the first lateral dimension, and the first side of the first GEO spacecraft and the second side of the first GEO spacecraft are displaced along the second lateral dimension.

* * * * *